United States Patent Office 3,445,484
Patented May 20, 1969

3,445,484
ORGANIC PHOSPHORUS COMPOUNDS
John Melvin Swan and Jocelyn Margaret Gregory, Melbourne, Victoria, Australia, assignors to Imperial Chemical Industries of Australia and New Zealand Limited, Melbourne, Victoria, Australia, a company of Australia, and Commonwealth Scientific and Industrial Research Organization
No Drawing. Filed Nov. 16, 1964, Ser. No. 411,545
Claims priority, application Australia, Dec. 20, 1963, 39,092/63
Int. Cl. C07f 9/02; A01n 9/36
U.S. Cl. 260—349              103 Claims This invention relates to new and useful organic phosphorus compounds; in particular it relates to phosphorus compounds which have useful biological, especially pesticidal properties, and to their intermediates.

Accordingly the present invention provides new phosphorus compounds of the formula

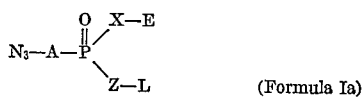

(Formula Ia)

wherein $N_3$ is an azido group, A is selected from the group consisting of

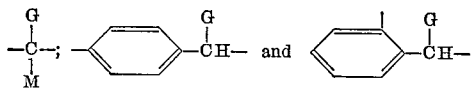

the azido group being in the para- or ortho-position of the benzene ring, and G and M, which may be the same or different, are selected from the group consisting of hydrogen, alkyl, aryl, alkaryl, aralkyl and cycloalkyl and wherein X and Z, which may be the same or different, are selected from the group consisting of O, S and N—R, R being either hydrogen or a hydrocarbon as defined hereinafter and wherein L, E and R, which may be the same or different, represent a hydrocarbon radical selected from the group consisting of alkyl, alkenyl, alkynyl, aryl, alkaryl, aralkyl, aralkenyl, cycloalkyl, cycloalkenyl, and wherein any one of the radicals L, E, G, M and R, whenever it stands for a hydrocarbon, optionally, may bear one or more substituents selected from the group halogen, cyano, hydroxy, amino, alkylamino, dialkylamino, oxo, alkoxy, aryloxy, alkylthio, arylthio, carbamido, acyloxy, alkoxycarbonyl, aryloxycarbonyl, nitro, nitroso or azido, provided however that no carbon carries more than one azido group and that the total number of the azido groups in the molecule is not more than two and wherein, optionally, E and L may be linked to form a 5, 6 or 7 membered heterocyclic ring with the phosphorus atom, and wherein further, whenever both X and Z stand for Y where Y is either O or S, L may also be hydrogen or a cation and wherein furthermore either one or both groups —X —E and —Z —L may be taken to represent a chlorine atom.

The preferred compounds of our invention have useful biological, particularly pesticidal properties. Accordingly we also provide new organophosphorus compounds of the formula

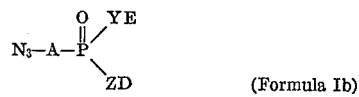

(Formula Ib)

wherein $N_3$ is an azido group, A is selected from the group consisting of

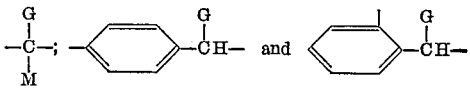

the azido group being in the para- or ortho-position of the benzene ring, and G and M, which may be the same or different, are selected from the group consisting of hydrogen, alkyl, aryl, alkaryl, aralkyl and cycloalkyl and wherein Y stands for O or S and Z stands for O or S or NR and Y and Z may be the same or different, R being either hydrogen or a hydrocarbon as defined hereinafter and wherein D stands for a hydrocarbon radical selected from the group consisting of alkyl, alkenyl, alkynyl, aralkyl, aralkenyl, cycloalkyl and cycloalkenyl and wherein E and R, which may be the same or different, represent a hydrocarbon radical selected from the group consisting of alkyl, alkenyl, alkynyl, aryl, alkanyl, aralkyl, aralkanyl, cycloalkyl and cycloalkenyl, and wherein any one of the radicals D, E, G, M and R, whenever it stands for a hydrocarbon, optionally, may bear one or more substituents selected from the group consisting of halogen, cyano, hydroxy, amino, alkylamino, dialkylamino, oxo, alkoxy, aryloxy, alkylthio, arylthio, carbamido, acyloxy, alkoxycarbonyl, aryloxycarbonyl, nitro, nitroso or azido, provided however that no carbon carries more than one azido group and that the total number of the azido groups in the molecule is not more than two and wherein, optionally, E and D may be linked to form a 5, 6 or 7 membered heterocyclic ring with the phosphorus atom.

In general the preferred alkyl groups are lower alkyl having 1 to 5 inclusive carbon atoms; the preferred aryl is phenyl, the preferred aralkyl is benzyl; the preferred alkaryl is tolyl; the preferred cycloalkyl is cyclohexyl.

Typical compounds according to the present invention are diethyl azidomethylphosphonate

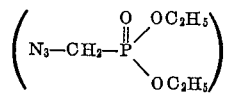

dimethyl azidomethylphosphonate, di-isopropyl azidomethylphosphonate, diethyl 1-azidoethylphosphonate, di-(sec. butyl) azidomethylphosphonate, ethyl 3,5,5 - trimethylhexyl azidomethylphosphonate, ethyl n-dodecyl azidomethylphosphonate, methyl ethyl azidomethylphosphonate, methyl isopropyl azidomethylphosphonate, methyl n-propyl azidomethylphosphonate, diethyl α-azidobenzylphosphonate, diphenyl azidomethylphosphonate, methyl isobutyl azidomethylphosphonate, ethyl isopropyl azidomethylphosphonate, ethyl (o-chlorophenyl) azidomethylphosphonate, methyl phenyl azidomethylphosphonate, O,S-diethyl azidomethylphosphonothiolate, diethyl azidomethylphosphonodithiolate

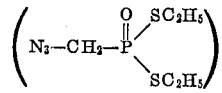

methyl N,N-diethylazidomethylphosphonamidate

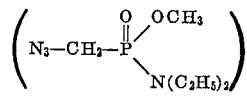

P-azidomethyl-N,N,N′,N′-tetramethylphosphonic diamide

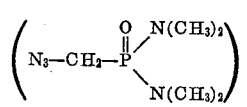

ethyl 1,2 - di(ethoxycarbonyl)ethyl azidomethylphosphonate

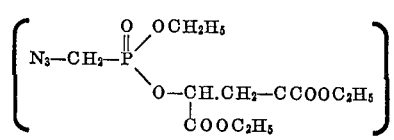

diethyl 1-azido-1-phenyl-2-hydroxyethylphosphate

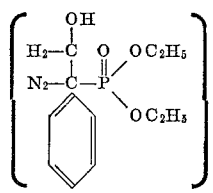

diethyl p-azidobenzylphosphonate

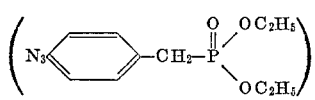

ethyl 2-hydroxyethyl azidomethylphosphonate,
ethyl 2-chloroethyl azidomethylphosphonate

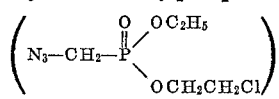

ethyl 2-ethylthioethyl azidomethylphosphonate

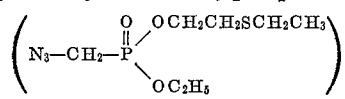

ethyl 2-ethoxyethyl azidomethylphosphonate

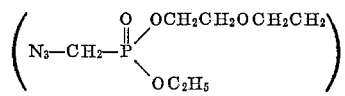

ethyl n-propyl azidomethylphosphonate

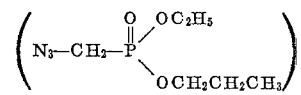

ethyl cyclohexyl azidomethylphosphonate

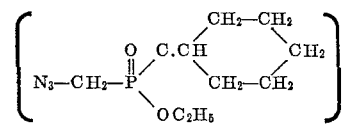

ethyl p-nitrophenyl azidomethylphosphonate

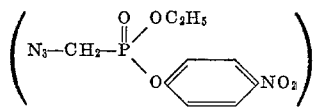

ethyl n-butyl azidomethylphosphonate

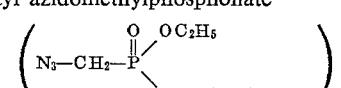

ethyl allyl azidomethylphosphonate

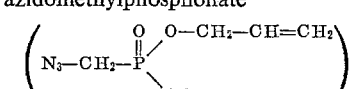

ethyl propargyl azidomethylphosphonate

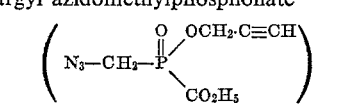

ethyl 2-diethylaminoethyl azidomethylphosphonate

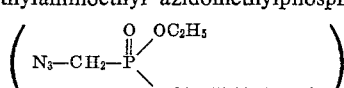

ethyl benzyl azidomethylphosphonate

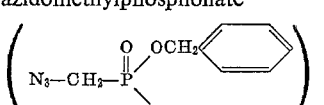

ethyl n-amyl azidomethylphosphonate

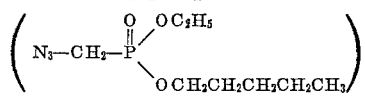

ethyl 2-cyanoethyl azidomethylphosphonate

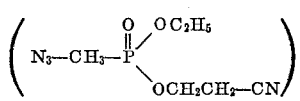

Other compounds according to this invention are given in the examples.

We also provide a process of manufacture of certain compounds of this invention which comprises reacting a compound of the general formula

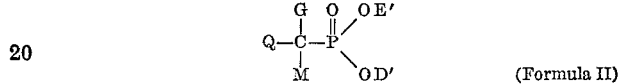 (Formula II)

with a water soluble metal azide over prolonged periods in a polar solvent wherein Q is selected from the group consisting of chlorine, iodine and bromine and wherein G and M have the meaning hereinbefore defined and wherein D' and E' equal D and E respectively as hereinbefore defined, except, however, that D' and E' cannot be an allylic or acetylenic radical. While extremely high polarity of the solvent is not a necessary condition for the reaction, high polarity considerably decreases reaction time and increases yields. Preferred polar solvents are the dipolar aprotic solvents. Very small amounts of water in dipolar aprotic solvents may be tolerated. Non-polar aprotic solvents e.g. benzene may be used as diluents of the dipolar aprotic solvent.

Suitable temperatures are between 20 and 200° C., preferably between 50 and 170° C., e.g. 150° C. The reaction time required varies with the product; periods between 2 and 40 hours have been found satisfactory. Suitable dipolar aprotic solvents are dimethyl sulphoxide, N,N-dimethylformamide, N,N-diethylformamide and also N-methylpyrrolidone, N,N-dimethylacetamide and sulpholane. By water soluble azides we mean the alkali metal, the alkaline earth metal and the zinc azides. Sodium and potassium are preferred. Atmospheric pressure is used for convenience but, depending on the desired reaction temperature, higher and lower pressures are within the scope of the invention.

The ease with which the above stated reaction of a compound of the Formula II with an alkali metal azide proceeds in the presence of a solvent, i.e. the reaction time required, the amount of by-products formed and the yield of the desired product varies with the solvent and also with the type of substituents D', E', G and M.

Thus we have found e.g. that using N,N-dimethylformamide as a solvent, diakyl chloromethylphosphonates react with sodium azide to produce primarily a half ester salt, sodium alkyl azidomethylphosphonate. The yield of the compounds of the formula

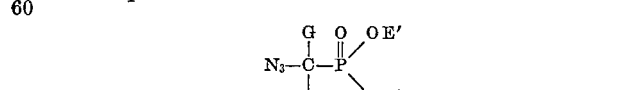 (Formula III)

in one step is then relatively small and the reaction leads predominantly to the half ester salt, which in itself is a useful intermediate in the synthesis of certain compounds of our invention.

Accordingly we also provide a process of reacting a compound of the formula

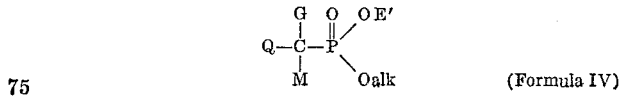 (Formula IV)

wherein alk stands for an alkyl group, substituted or unsubstituted, with a water soluble metal azide as defined above to produce a half ester salt of the formula $$\begin{array}{c} G \quad O \quad OE'' \\ | \quad \| \, / \\ N_3-C-P \\ | \quad \ \\ M \quad Ocat \end{array} \quad \text{(Formula V)}$$

wherein E', Q, G and M have the meanings above defined and wherein cat is a cation and E'' is the less easily displaceable of the two radicals E' and alk. It is within this process to produce mixtures of compounds of Formula V bearing the substituents E' or alk respectively. The reaction is carried out at temperatures between 50 and 200° C., preferably between 50 and 170° C. over a period of several hours. The most preferred temperature range is 100–170° C. The presence of a polar solvent, preferably a dipolar aprotic solvent is desirable. Preferred cations are Na, K. Pressure is conveniently atmospheric but both reduced and superatmospheric pressures may be used.

A preferred method of carrying out this process comprises removing the alkyl azide (formed during the reaction by dealkylation) by distillation and completing the reaction then at temperatures above the distillation temperature of the alkyl azide formed.

The compounds of the formula $$\begin{array}{c} G \quad O \quad OE \\ | \quad \| \, / \\ N_3-C-P \\ | \quad \ \\ M \quad Ocation \end{array} \quad \text{(Formula VII)}$$

and their sulphur analogues $$\begin{array}{c} G \quad O \quad SE \\ | \quad \| \, / \\ N_3-C-P \\ | \quad \ \\ M \quad Ocation \end{array}$$

where E, G and M have the above defined meanings, and cation stands for a cation or hydrogen, are new; they are useful intermediates in the manufacture of biologically active compounds e.g. of compounds of the formula $$\begin{array}{c} G \quad O \quad OE \\ | \quad \| \, / \\ N_3-C-P \\ | \quad \ \\ M \quad OD \end{array}$$

and, via syntheses involving additional steps, of compounds of the formula $$\begin{array}{c} G \quad O \quad OE \\ | \quad \| \, / \\ N_3-C-P \\ | \quad \ \\ M \quad ZD \end{array} \quad \text{(Formula VI)}$$

wherein G, M, E, D and Z have the above defined meanings.

Accordingly we also provide compounds of the formula $$\begin{array}{c} G \quad O \quad YE \\ | \quad \| \, / \\ N_3-C-P \\ | \quad \ \\ M \quad Ocation \end{array}$$

where cation, G, M, Y and E have the meanings above defined.

In the process of reacting alkyl esters of the Formula IV with water soluble azides, whenever dealkylation occurs to a substantial degree, it is more economical to use an alkalising agent to remove the labile ester group prior to reaction with the azide.

Accordingly we also provide a process of reacting a compound of Formula IV with at least one mole of an alkalising agent to produce a compound of the formula $$\begin{array}{c} G \quad O \quad OE'' \\ | \quad \| \, / \\ Q-C-P \\ | \quad \ \\ M \quad Ocat \end{array} \quad \text{(Formula VIII)}$$

and reacting Compound VIII further with at least one mole of an azide, under the conditions described above for the reaction leading from Compound IV to Compound V, thereby producing a compound of Formula V, where Q, G, M, E', E'', cat and the water soluble azide are as defined above.

Suitable alkalising agents are the alkali metal hydroxides, carbonates and, when a dipolar aprotic solvent or high boiling solvent such as "Methylcellosolve" (registered tradmark) is used as the reaction medium, even the alkali metal halides. Other alkalising agents suitable to cause hydrolysis of a phosphonate alkyl ester group in both aqueous and non-aqueous media are known from the prior art.

Furthermore we have found methods of transforming half ester salts of Formula VII into diesters.

Accordingly we also provide a process of reacting a half ester salt of formula $$\begin{array}{c} G \quad O \quad OE \\ | \quad \| \, / \\ N_3-C-P \\ | \quad \ \\ M \quad Ocat \end{array}$$

further with an alkylating reagent selected from the group consisting of substituted or unsubstituted alkyl iodides, alkyl bromides, α-oxoalkyl halides, reactive aryl halides, reactive benzyl halides, alkyl sulphonates and dialkyl sulphates to provide a compound of the formula $$\begin{array}{c} G \quad O \quad OE \\ | \quad \| \, / \\ N_3-C-P \\ | \quad \ \\ M \quad OE''' \end{array} \quad \text{(Formula IX)}$$

where E, G and M are as defined above and E''' is the ester group of the above defined alkylating agent and may be the same as E or different. Fluorides are not reactive halides.

In a preferred form of this process the reaction is carried out in the presence of a dipolar aprotic solvent, particularly dimethylformamide. We consider that the dipolar aprotic solvent acts as a promoter of the alkylation of the phosphonate anion, increasing thereby the rate of reaction and yields. The dipolar aprotic solvent may be diluted with non-polar solvents, e.g. benzene or methylene dichloride. The presence of water is undesirable.

When the anion formed during this reaction is a halide ion, it is a dealkylating agent in respect of alkyl ester groups and yields from this process then tend to be small. In this case yields can, however, be somewhat improved by the choice of trialkylammonium as the cation in Formula VII.

The reaction is carried out at elevated temperatures, between 30 and 150° C., conveniently on a steam bath (e.g. between 50 and 100° C.).

Furthermore we provide a process of converting the half ester salt of the Formula VII into a half ester acid of the formula $$\begin{array}{c} G \quad O \quad OE \\ | \quad \| \, / \\ N_3-C-P \\ | \quad \ \\ M \quad OH \end{array} \quad \text{(Formula X)}$$

wherein G, M, E and cat have the meanings above stated, which process comprises reacting said half ester salt with an ion exchange resin in the acid form. A suitable ion exchange resin acid is the resin symbolised by R'.SO₃H, where the hydrocarbon radicals R' are known from the prior art.

An alternative to this reaction is to use a strong mineral acid, e.g. sulphuric or hydrochloric acid in place of the ion exchange resin.

The half acids of Formula X which are useful intermediates for the manufacture of biologically active compounds, e.g. compounds of the Formula IX, are new compositions of matter.

We also provide a process of converting a half ester acid of the formula $$\begin{array}{c} G \quad O \quad YE \\ | \quad \| \, / \\ N_3-C-P \\ | \quad \ \\ M \quad OH \end{array}$$

into a diester which process comprises reacting said half ester acid with an alcohol or phenol in the presence of dicyclohexylcarbodi-imide and, optionally, additionally in the presence of a solvent. Suitable solvents are e.g. anhydrous pyridine, tetrahydrofuran, excess alcohol, ethylene dichloride and ethyl acetate.

We also provide a further process of converting the half ester acid of Formula X into the alkyl ester

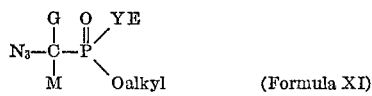 (Formula XI)

which process comprises reacting a compound of the formula

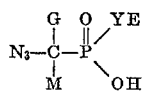

with a diazoalkane, where G, M, E and Y have the meanings above defined and alkyl is the residue corresponding to the diazoalkane used. The preferred diazoalkane is diazomethane.

Furthermore we provide a process of manufacturing esters of the formula

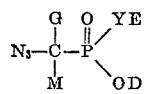

which process comprises reacting a half ester acid of the formula

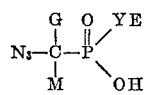

with an ester of orthoformic acid HC(OD)$_3$, where D is the desired radical in the phosphonate ester. The preferred esters in this process are the lower alkyl esters. The process is carried out at elevated temperatures, preferably between 40° C. and the boiling point of the reaction mixture, preferably at atmospheric or slightly reduced pressures. The use of a solvent, e.g. of an excess of the alcohol DOH or of a further compound such as cyclohexane, pyridine, toluene and the use of slightly elevated pressures is within the process of the invention. The presence of water is undesirable and should therefore be minimised as it causes hydrolysis of the orthoformate ester and wastes reagent. When an alcohol D″OH other than that corresponding to the group D of the orthoformate ester is added, e.g. when a large excess of n-propyl alcohol is employed in the reaction using triethyl orthoformate as the esterifying agent, a mixture of esters

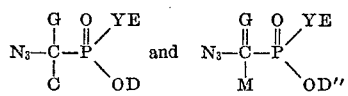

is obtained where D is the radical of the orthoformate ester and D″ is the radical of the added alcohol.

Yet a further process according to this invention comprises reacting a half ester salt of formula

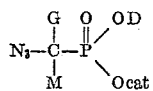

optionally in the presence of an inert solvent, with thionyl chloride to produce a dichloride of the formula

 (Formula XII)

where D, cat and M have the above stated meanings.

Reaction conditions are known from the prior art of chlorination with thionyl chloride; water must be absent since it wastes reagents and product and temperatures between −10° and 100° C. and gradual addition of the thionyl chloride over a period between 15 minutes and several hours are advisable.

The dichlorides of Formula XII may be converted into esters, thiolesters, amides and ester-chloridates of the Formulae XIII, XV and XIV below respectively by reactions known "per se." Accordingly we also provide a process of manufacturing compounds of Formula XIII comprising reacting a dichloride of Formula XII with a compound of the formula EZH, wherein E and Z are as defined above. When at least two moles of EZH per mole of said dichloride are used the diester

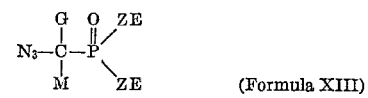 (Formula XIII)

is formed. Alternatively, according to a further process of our invention, the dichloride of Formula XII is reacted first with one molar proportion of a compound EZH and the resulting chloridate

 (Formula XV)

is then reacted further with at least one molar proportion of a compound E$_1$XH to form a compound

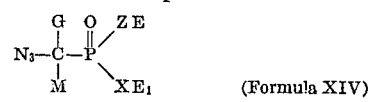 (Formula XIV)

wherein G, M, E, X and Z are as above defined and E$_1$ is defined as E and wherein, whenever both X and Z have the meaning of Y as above defined E$_1$ may also be hydrogen or cation, and wherein E$_1$ and E may be the same or different and X and Z may be the same or different.

Suitable compounds EZH and E$_1$XH are e.g. the lower alcohols, thiols or amines such as ethanol, butanol, ethanethiol, ethylamine or diethylamine respectively.

Another process according to our present invention comprises reacting approximately one mole of thionyl chloride with one mole of a half ester salt of formula

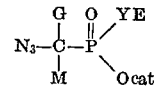

preferably in the presence of a low boiling inert solvent to produce a monochloride of the formula

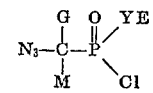

where G, M, E and Y have the meanings above defined.

Preferred solvents are diethyl ether and methylene dichloride. Suitable reaction conditions are temperatures between −10 and 50° C, absence of water, and gradual addition of the thionyl chloride to said half ester salt.

The resulting monochlorides may be converted into compounds of the formula

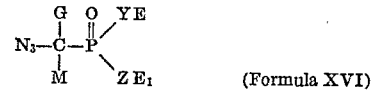 (Formula XVI)

by reaction with a compound of the formula E$_1$ZH, wherein G, M, E, E$_1$, Y and Z are all as defined above.

The di- and mono-chlorides of Formulae XII and XV are useful intermediates in the manufacture of biologically active substances and are new compounds.

Accordingly we also provide new compounds of Formulae XII and XIV.

A further process according to this invention comprises reacting a half ester salt of Formula VII with an ester of chlorcarbonic acid such as ethyl chlorocarbonate and a compound of formula DOH to yield a compound of formula

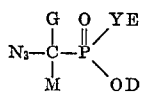

wherein G, M, D, E, cat and Y have the meanings above stated.

The reagent DOH, preferably a lower alcohol such as methanol, ethanol, isopropanol etc., may be added to Compound VII simultaneously with the chlorocarbonate or, alternatively, the chlorocarbonate may be reacted first and the reagent DOH may then be added subsequently. Simultaneous addition of the two reagents is preferred. Solvents may be used as the reaction medium, provided they are inert in respect of the chlorocarbonate; suitable solvents are e.g. benzene, chloroform, trichlorethylene, carbon tetrachloride, acetone, dioxan. Alternatively an excess of reagent DOH e.g. an excess of ethanol, may be used.

The reaction with the chlorocarbonate is carried out under mild conditions, at temperatures between −20 and 120° C., preferably under stirring over several hours, but temperature and pressure are not narrowly critical.

We also provide a process for compounds of the general formula

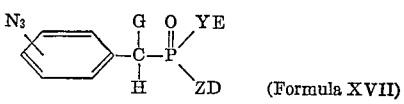 (Formula XVII)

wherein $N_3$ is in the ortho or para position and the phenylene ring may be further substituted and wherein G, Y, Z, E and D have the meanings described above which process comprises diazotising the aminobenzylphosphonate corresponding to the desired azidobenzylphosphonate (Formula XVII) and reacting the formed diazonium salt intermediate at low temperatures with a water-soluble azide.

The preparation of certain suitable starting materials, e.g. diethyl p-aminobenzylphosphonte is known (see F. Kagan, R. D. Birkenmayer and R. E. Strube, J.A.C.S., 81, 3026 (1959)); the method of diazotisation is conventional. During the addition of the water-soluble azide to the acid medium of diazonium salt the temperature is kept low, e.g. between 0 and −5° C.; after addition the reaction mixture is allowed to warm up gradually.

A further process according to the present invention comprises reacting an epoxy compound of the formula

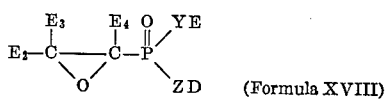 (Formula XVIII)

with a water-soluble azide to produce a compound

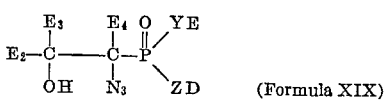 (Formula XIX)

together with a compound

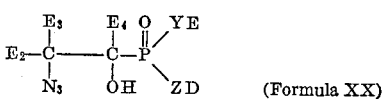 (Formula XX)

wherein $E_2$, $E_3$ and $E_4$ stand for hydrogen, alkyl, aryl or cycloalkyl and any two alkyl groups $E_2$, $E_3$, $E_4$ may be linked to form a cycloalkyl ring and D, E, Y and Z have the meanings stated above.

Preferably a solvent is used e.g. water or aqueous ethanol or aqueous dioxan containing a buffer capable of binding any liberated hydroxyl ion. Magnesium perchlorate is a suitable buffer.

Furthermore we provide an integrated 3-step process for the manufacture of compounds of the formula

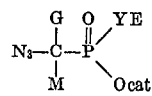

comprising firstly, reacting one mole of a chloride of the formula

 (Formula XXI)

with one mole of a compound EYH in the absence of water to produce a compound

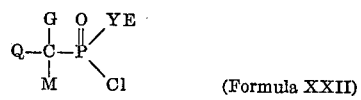 (Formula XXII)

secondly, reacting the latter compound further with at least one mole of water and one mole of an alkalising agent to form the half ester salt of the formula

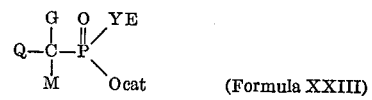 (Formula XXIII)

thirdly, reacting this latter half ester with a water-soluble azide, wherein G, M, Y, E and cat are as above defined.

The chemistry underlying the reactions in the 3-step process and the conditions suitable for carrying them out will be apparent to those skilled in the art. Suitable alkalising agents are the alkali metal hydroxides, carbonate and bicarbonates and their obvious chemical equivalents.

The azidoalkylphosphonate half ester salt may then be further reacted by one of the above disclosed processes for compounds of the Formulae IX, X, XI, XII, XIII, XIV and XV e.g. either by reaction with alkyl sulphonates, alkyl sulphates or the reactive alkyl or aryl halides as defined above or, alternatively, with ion exchange resins followed by esterification using either orthoformic acid esters or dicyclohexylcarbodi-imide or diazoalkanes or, alternatively by reactions with thionyl chloride.

Certain diesters falling within the scope of formula

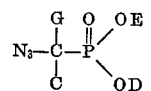

are not easily formed in high yields; we have now found that these more difficulty formed diesters may be made by a process of transesterification which is quite generally applicable to our diesters.

Accordingly we provide a process of reacting a diester of the formula

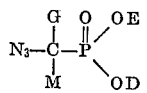

as defined above with at least one molar proportion of an alcohol under transesterification conditions. Conditions conducive to transesterification such as temperatures between −10° C. and the boiling point of the alcohol and suitable catalysts, as e.g. particularly alkali-metal alkoxides, are known from the prior art. By using increased amounts of the alcohol and/or longer reaction time more than one ester group may be transesterified to form diesters having the same ester groups or mixtures of these diesters with heteroesters.

Accordingly we also provide a process of reacting an ester of the formula

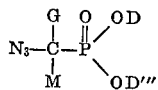

with at least two molar proportions of an alcohol $D_1OH$ to form the diester of said alcohol wherein G, M and D are as above defined and D''' is defined as D and any two of the three radicals, D, D''' and $D_1$ may be the same.

Compounds of this invention have useful biological properties; thus compounds of Formula Ib have shown high contact, residual and systemic insecticidal activity against various species of insects e.g. *Biophilus microplus* (cattle tick), *Calandra granaria* (grain weevil), *Plutella maculipennis* (cabbage moth) larvae, *Luciliu cuprina* (sheep blow fly) adult and larvae, *Aphis rosae* (rose aphis), *Musca domestica* (house fly) and *Tetranychus telarius* (red spider) adults and ova.

The compounds of this invention are remarkable in that substitution of the hydogen in parent compounds of the formula

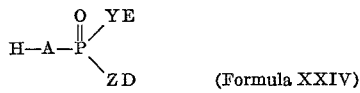

(Formula XXIV)

by the azido group imparts biological activity to many otherwise inactive organophosphenates or vastly increases mild to moderate biological activity of the parent compounds of Formula XXIV. Moreover many closely analogous compounds of the general formula

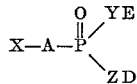

wherein X may be Cl, Br, I, —$ONO_2$ or —CN are inactive as insecticides. The introduction of the azido group creates an entirely new group of organophosphorus insecticides. A particular advantage of many of the compounds is that they are relatively non-toxic to mammals; mice have survived oral dosages from 50 to 1000 mg./kg. of bodyweight. Furthermore we have found that numerous plants, e.g. peas, mustard, ipomea, sunflower, lantana, dwarf beans, tobacco, tomatoes and cabbage are not affected by certain compounds of this invention e.g. diethyl azidomethylphosphonate, methyl isopropyl azidomethylphosphonate, methyl ethyl azidomethylphosphonate, and that in general the compounds of this invention have low phytotoxicity. Hence the compounds may also conveniently be applied systemically.

Yet a further adavntage of the compounds of this invention is their relatively high water solubility. Thus, for instance at 20° C. diethyl azidomethylphosphonate is completely miscible with water in all proportions. By suitable choice of the substituents, e.g. of E and D, the lyophilic/hydrophilic balance may be modified. The esters are highly water soluble when the alkyl chain is short, e.g. 1 to 4 carbons; increasing length of the carbon chain E and/or D decreases water solubility. The water soluble or water dispersible compounds of this invention may therefore be dissolved or dispersed directly in water without the use of surfactants and may then be applied as such. This is a marked advantage in practical use. Alternatively the compounds of the invention may be applied in the usual manner in admixture with carriers or diluents and, if desired, there may additionally be used auxiliary agents and/or plant nutrients.

According to a further feature of the invention we provide new pesticidal compositions which contain at least one of the said new phosphorus compounds of Formula Ib as the active pesticidal ingredient.

The said new phosphorus compounds may also be formulated as pesticidal compositions in the form of solutions, suspensions or dispersions in aqueous media containing suitable suspending or dispersing agents for example sodium dinaphthylmethanedisulphonate and sodium lauryl sulphate.

The new pesticidal compositions, as said above, may also contain carriers or diluents especially carriers other than water, e.g. organic solvents, mixtures of organic solvents or mixtures of water and organic solvents, auxiliary agents and/or plant nutrients. Carriers, auxiliary agents and plant nutrients do not constitute completely independent categories since substances can be used which act in more than one of these categories.

The carriers may be liquids or solids. As liquids there may be used water, as already mentioned, and non-phytocidal organic solvents. These liquids may be used both for compositions for direct application and for compositions in concentrated form suitable for use after dilution. Solid carriers include inert pulverulent diluents, for example talc, kieselguhr, bentonite and other colloidal clays and powdered chalk. These carriers are used almost entirely for making pulverulent preparations for direct application. For concentrated solid preparations there may be used other solid carriers and more particularly water-soluble organic and inorganic compounds; with these the toxic ingredient may be incorporated to give a shaped tablet or block or a non-hygroscopic free-flowing granular preparation. Solids which have auxiliary or plant nutrient properties can, in suitable cases, be used as carriers.

By auxiliary agents we mean substances other than carriers which assist in the preparation and handling of the compositions or in their application, which increases their effectiveness. Such auxiliary agents comprise a miscellany of substances. Thus in making pulverulent compositions, dust binding agents such as spindle oil, glycerol and wool fat may be used. Wetting, spreading and dispersing agents such as sodium lauryl sulphate and substances adapted to promote adhesion or so-called sticking agents, such as glue and resin, may be used, U.V. screening agents may be added to prevent photochemical degradation.

Plant nutrients, that is nutrients which are applied directly to the leaves or other above-ground portions of the plant as distinct from fertilisers which are applied indirectly to the plant through the ground include such substances as urea and magnesium sulphate.

Such plant nutrients can, we have found, be incorporated into the compositions of this invention and the resulting products can be applied to plants and in this way results which would otherwise need two applications to the plants can be obtained by means of a single application. Moreover certain plant nutrients can in some preparations play the part of carrier. Thus solid preparations may be made consisting of urea and an ester, which can be dissolved in water to yield solutions which can be applied as combined nutritive-pesticidal washes and sprays, or again such preparations may contain also a dispersing agent so as to yield with water dispersions useful as combined nutritive-pesticidal washers and sprays.

In giving examples of specific carriers, auxiliary agents and plant nutrients and specific kinds of these as well as specific modes of incorporation, we do this by way of illustration only and not by way of confining the invention to any of all of these.

For most purposes aqueous formulations are not only the most efficient in action, but also the easiest in application and the most simple in preparation. Moreover the aqueous preparations can in nearly all cases be aqueous solutions, as even with the less soluble compounds, the solubility is in most cases sufficient to give the very dilute solutions, which are all that is needed for effective action against certain plant-feeding mites and insects.

We also provide a method of combating plant pests comprising treating infected plants with formulations comprising as active constituents compounds of the present invention.

As a further feature of the invention we provide a process of combating insect pests in domestic animals comprising treating said animals with formulations according to the present invention at a dosage level of the active ingredient below the mammalian toxicity threshold for the animal to be treated. A specific, particularly useful form of combating pests comprises applying the compounds of our invention systemically through the medium of a plant.

We also provide a process of combating cattle tick by treating cattle with the compounds of the present invention.

The invention is now illustrated by, but not limited to, the following examples in which all parts are by weight and pressures in mm. Hg.

Example 1

Diethyl chloromethylphosphonate (15 g.) and sodium azide (15 g.) were heated in dimethyl sulphoxide (50 ml.) in a boiling water bath for 30 hours under reflux condenser and with exclusion of moisture. The cooled reaction mixture was then dissolved in cold 5 N hydrochloric acid (20 ml.) and the aqueous acid solution was extracted continuously with ether for 24 hours. The ethereal extract was dried, the ether evaporated and the residual oil (7 g.) distilled in a high vacuum. Three fractions were obtained of the following boiling ranges:

Fraction 1: B.P. 50–65° C./0.4–0.5 mm., 0.5 g.
Fraction 2: B.P. 64–70° C./0.3–0.4 mm., 3.3 g., $n_D^{29}$ 1.4379
Fraction 3: B.P. 70–72° C./0.2–0.3 mm., 2.3 g., $n_D^{29}$ 1.442

On analysis, by infra-red spectroscopy and by proton magnetic resonance spectroscopy, fraction 2 was shown to contain diethyl sulphoxide (6%), unchanged diethyl chloromethylphosphonate (56%) and diethyl azidomethylphosphonate (38%). In the same manner fraction 3 was shown to contain dimethyl sulphoxide (2%), unchanged diethyl chloromethylphosphonate (40%) and diethyl azidomethylphosphonate (58%). Fractions 2 and 3 were combined and fractionally redistilled. Diethyl azidomethylphosphonate was obtained as an oil, B.P. 62° C./0.5 mm., $n_D^{20}$ 1.441. (Found: C, 30.65; H, 6.56; N, 21.13%. Calc. for $C_5H_{12}N_3O_3P$: C, 31.0; H, 6.26; N, 21.76%).

The proton magnetic resonance spectrum of this compound, measured in carbon tetrachloride solution using tetramethylsilane as an internal standard ($\delta = 0.00$ p.p.m.), showed a triplet due to the six —$OCH_2CH_3$ protons ($\delta = 1.37$ p.p.m., J=8 c.p.s.), a doublet due to the $N_3CH_2$—P protons ($\delta = 3.43$ p.p.m., J=12 c.p.s.) and a complex multiplet of 5 lines from 230–270 c.p.s. due to the P—O—$CH_2$ protons. The spectrum of diethyl chloromethylphosphonate was identical except that the

$Cl.CH_2$—P proton had a chemical shift of $\delta = 3.53$ p.p.m., and a spin-spin splitting of J=11 c.p.s.

We consider that in the above process, the main side reactions are attack of the azide ion on the alkoxide groups attached to phosphorus, leading to the formation of ethyl azide, sodium ethyl chloromethylphosphonate and sodium ethyl azidomethylphosphonate.

Example 2

Di-isopropyl chloromethylphosphonate (9.5 g.) and sodium azide (8.5 g.) were heated on a water bath in dimethyl sulphoxide (22 ml.) for 28 hours. The mixture was then cooled and extracted with ether (5 portions of 20 ml. each). The combined ether extracts were evaporated and the resultant heavy oil (5 g.) was distilled under high vacuum. The fraction boiling at 90–90°/2 mm. was collected (0.9 g.) and showed infrared absorption at 2100 cm.$^{-1}$ due to the presence of di-isopropyl azidomethylphosphonate. Analysis by gas-liquid chromatography showed the crude product to contain di-isopropyl azidomethylphosphonate (34%), unchanged di-isopropyl chloromethylphosphonate (18%) and dimethyl sulphoxide (48%).

Example 3

Di-isopropyl chloromethylphosphonate (4 g.) and sodium azide (3.6) g.) were heated in N,N-dimethylformamide (20 ml.) with exclusion of moisture for 23 hours at 110–120° C. and finally at the boiling point of the solvent for a further 3 hours. The mixture was cooled, diluted with diethyl ether (200 ml.) and the inorganic precipitate was filtered off with the addition of a little "Celite" filter aid. "Celite" is the registered trademark for purified diatomaceous earth, available commercially. The filtrate was evaporated to remove ether and the dimethylformamide was distilled out at 42–45° C./12 mm. The viscous residue was evaporated three times with chloroform and finally heated at 70° C. under a pressure of 1–2 mm. in order to remove the last traces of dimethylformamide. The solid residue (1.8 g.) was identified by elemental analysis, infrared spectroscopy and nuclear magnetic resonance spectroscopy, as sodium isopropyl azidemethylphosphonate.

This salt was converted into the half ester acid as described in Example 9.

Example 4

A solution of ethyl sodium azidomethylphosphate (30 g.) in 150 ml. of water was applied to a column containing a sufficient quantity of an acid ion-exchange resin in the $R'.SO_3H$ form, available commercially under the registered trademark "Dowex" 50 and the column was developed with water. The acid eluate was collected and evaporated to dryness in vacuo to yield ethyl hydrogen azidomethylphosphonate as a solid in nearly quantitative yield. This acid (16.5 g., 0.1 mole) was dissolved in water (100 ml.) and triethylamine (10.1 g., 0.1 mole) added dropwise and with stirring. The solution was then evaporated to dryness in vacuo to leave ethyl triethylammonium azidomethylphosphonate as a colourless solid in virtually quantitative yield.

Example 5

To a solution of ethyl triethylammonium azidomethylphosphonate (26.6 g., 0.1 mole) in acetone (100 ml.) at room temperature, was added dropwise, with stirring, ethyl iodide (18.7 g., 0.12 mole) in acetone (20 ml.). The mixture was left standing for 2 hours and then heated under reflux for a further 2 hours. The acetone and unreacted ethyl iodide were removed under reduced pressure to leave an oil which was extracted with ether. The ether extract was filtered, dried over anhydrous sodium sulphate and filtered again. When the ether was removed a clear oil remained. Crude yield=1.9 g.=10%. This was then distilled in vacuo. B.P.=69–71°/0.01 mm., $n_D^{19}=1.4453$. Infrared and nuclear magnetic resonance analyses showed the compound to be diethyl azidomethylphosphonate. Yield=1.35 g.=7%.

Example 6

Diethyl chloromethylphosphonate (10 g.) and sodium azide (10.4 g.) were heated under reflux in N,N-dimethylformamide (40 ml.) with exclusion of moisture for 4 hours. Ethyl azide and some of the dimethylformamide solvent were removed by distillation at ordinary pressure from 50–150° C., the rest of the dimethylformamide was removed by distillation at 40–50° C. under a pressure of 10–15 mm. Hg. The semi-solid residue was washed by decantation with ether (4 portions of 50 ml.) to remove the last traces of solvent, and the residue was then extracted with boiling absolute ethanol (one portion of 50 ml. followed by two further portions of 10 ml. each). The insoluble residue was shown to be a mixture of sodium azide (unreacted) and sodium chloride (formed during the reaction). Evaporation of the combined ethanol extracts gave sodium ethyl azidomethylphosphonate as a hygroscopic mass (12.3 g.).

Example 7

Diethyl chloromethylphosphonate (20.0 g.) and sodium azide (20.8 g., 33% excess) were heated in dimethylformamide (80 ml.) with exclusion of moisture, and with stirring. Ethyl azide was distilled off as formed; heating was continued until no more ethyl azide was evolved. The mixture was heated for a further 4 hours at the reflux temperature and then allowed to cool. Sodium chloride and excess sodium azide were centrifuged off from the dimethylformamide solution of the product. The solids obtained were extracted with dimethylformamide and centrifuged off four times. Dimethylformamide was distilled off from the combined solution and extracts, at a pressure of 20 mm. of Hg. Ethyl sodium azidomethylphosphonate, 18.0 g., (90%), was obtained as a slightly yellowish-white solid.

Example 8

Example 8 demonstrates the effect of temperature, of the nature of the halide, and of the addition of cosolvents on the process of substitution by an azido group.

(a) A mixture of diethyl iodomethylphosphonate (31 g.), sodium azide (21.7 g.) and N,N-dimethylformamide (150 ml.) was stirred at room temperature, and the progress of the reaction was estimated by gas-liquid chromatographic analysis. The amount of diethyl iodomethylphosphonate decreased steadily and the yield of diethyl azidomethylphosphonate present in the mixture amounted to 17% after 5 days, 23% after 7 days and 27% after 14 days.

(b) The reaction described under (a) above was repeated, except that a temperature of 50° C. was employed. After 7 days, diethyl azidomethylphosphonate was formed in a yield of 10.6%. The bulk of the product was sodium ethyl azidomethylphosphonate together with some sodium ethyl iodomethylphosphonate.

(c) The reaction described under (b) above was repeated except that a temperature of 80° C. was employed. After 27 hours, virtually no starting material was present, the product being substantially sodium ethyl azidomethylphosphonate.

(d) Diethyl chloromethylphosphonate (10 g.) and sodium azide (9.8 g.) were heated with stirring in diethylformamide at 120° C. for 7 hours. After this time, it was shown by gas-liquid chromatography that none of the chloroester remained, and very little of the desired diethyl azidomethyl phosphonate was present. The solvent was evaporated under reduced pressure, the residual solid was dissolved in water, passed through a column of "Dowex" 50 as described in Example 4 and esterified with triethyl orthoformate as described in Example 10. Distillation gave 5.8 g. of product, shown by gas-liquid chromatography to contain approximately equal parts of diethyl chloromethylphosphonate and diethyl azidomethylphosphonate.

(e) Diethyl iodomethylphosphonate (0.1 g.) and sodium azide (0.1 g.) were heated at 60° C. in a mixture of dimethylformamide (0.75 g.) and water (0.2 g.) for 24 hours. The yield of diethyl azidomethylphosphonate, estimated by gas-liquid chromatography amounted to 13%. When the dimethylformamide was replaced by tetrahydrofuran, or when water only (0.65 g.) was used, none of the desired product was formed. When the reaction was carried out in a mixture of acetone (0.69 g.) and water (0.18 g.), the yield of azide ester was 2%.

(f) Diethyl chloromethylphosphonate (2 g.) and sodium azide (1.4 g.) were heated with stirring in a mixture of benzene (20 ml.) and dimethylformamide (3 ml.) at the reflux temperature of 88° C. Analysis by gas-liquid chromatography showed that after 3 hours, about 8% of the starting material had been converted into diethyl azidomethylphosphonate.

Example 9

A solution of sodium isopropyl azidomethylphosphonate (1 g.) in water (5 ml.) was applied to a column containing a sufficient quantity of an acid ion-exchange resin in the R'.SO$_3$H form, available commercially under the registered trademark "Dowex" 50 and the column was developed with water. The acid eluate was collected and evaporated to dryness, giving isopropyl hydrogen azidomethylphosphonate as an oil in virtually quantitative yield. This acid was then treated with one equivalent of diazomethane in ether; evaporation of the solvent gave isopropyl methyl azidomethylphosphonate as an oil, identified by infrared and nuclear magnetic resonance spectra.

Example 10

Ethyl hydrogen azidomethylphosphonate was obtained from the sodium salt (37.4 g., 0.2 mole) as described in Example 4. The last traces of water were removed by azeotropic distillation with toluene followed by xylene. The solvents were removed by distillation and triethyl orthoformate (59.2 g., 0.4 mole) was added. The mixture was heated at 80° C. under a reflux condenser for 6 hours. Ethyl formate and ethanol formed during the reaction as well as excess triethyl orthoformate were removed by distillation and the crude product was distilled under reduced pressure (B.P. 80° C./1.0 mm. Hg). A yield of 32.8 g. (85% of theory) of diethyl azidomethylphosphonate was obtained.

Example 11

Dry ethyl hydrogen azidomethylphosphonate was obtained as in Example 10 by ion exchange and azeotropic distillation followed by removal of the solvents as described. Triethyl orthoformate (59.2 g., 0.4 mole) was then added together with 30 mls. of absolute ethanol and the mixture was heated under reflux for 12 hours. Ethyl formate, ethanol and excess triethyl orthoformate were removed by distillation and the crude product was distilled under reduced pressure as described in Example 10. Diethyl azidomethylphosphonate was obtained in 87% yield.

Example 12

Ethyl hydrogen azidomethylphosphonate (1.41 g., 8.5 mmole) was dissolved in dry pyridine (8 g.) and dry ethanol (1 g.) was added, followed by dicyclohexylcarbodi-imide (3.55 g., 17 mmole). A white solid—dicyclohexylurea—separated out at once, with liberation of heat. After 20 hours at room temperature, the dicyclohexylurea was filtered off and washed with ether. The solvent was evaporated, the residue was taken up in ether, glacial acetic acid (0.7 g.) was added to the solution and the flask was set aside overnight. More dicyclohexylurea was filtered off and the product was distilled to give diethyl azidomethylphosphonate, B.P. 77–79/0.7 mm., 1.26 g. By gas-liquid chromatographic analysis the ester was shown to be pure.

Example 13

Ethyl hydrogen azidomethylphosphonate, (2.5 g., 15.1 mmole) was dissolved in ethyl acetate (50 ml.) and dried. p-Nitrophenol (2.54 g., 18.2 mmole) was added, the mixture was cooled to 0° C. and a solution of dicyclohexylcarbodi-imide (16.3 g., 30.2 mmole) in ethyl acetate (10 ml.) was then added dropwise over 15 minutes. The reaction mixture was left in the ice-bath and allowed to warm up to room temperature overnight. The dicyclohexylurea was filtered off, and the filtrate was evaporated to dryness to yield a yellowish-green oil (8.5 g.), shown by thin-layer chromatography to contain much of the starting materials and some of the required ester. The product was again dissolved in ethyl acetate (25 ml.), dicyclohexylcarbodi-imide (3.15 g., 15.1 mmole) was added and the mixture was heated to reflux for 2 hours, then set aside overnight. Dicyclohexylurea was filtered off. Attempts to remove excess p-nitrophenol by washing an aliquot of the filtrate with sodium carbonate solution led to gradual hydrolysis of the p-nitrophenyl ester. Acetic acid was added to the remainder of the filtrate, which was set aside overnight. More urea was filtered off, and the filtrate was washed with bicarbonate solution, dried and solvent evaporated to yield a viscous oil (3.71 g.), consisting of the desired ethyl p-nitrophenyl ester, p-nitrophenol and other products. 1.22 g. of this oil was chromatographed on silica (BDH—chromatography grade). Elution with chloroform gave 0.22 g. of a colourless oil; further elution with chloroform-ether (2:1) yielded 0.32 g. of a CCl$_4$-insoluble oil and 0.61 g. of a semi-crystalline oil, shown by nuclear magnetic resonance spectroscopy to consist of ethyl p-nitrophenyl azidomethylphosphonate (13 molar parts), p-nitrophenyl (4 molar parts), triethyl phosphate (2 molar parts) and a trace of dicyclohexylurea.

Example 14

Ethyl hydrogen azidomethylphosphonate (3.0 g., 18 mmole) and n-amyl alcohol (1.60 g., 18 mmole) were dissolved in ethylene dichloride and a solution of dicyclohexylcarbodi-imide (9.3 g., 45 mmole) in ethylene dichloride (10 ml.) was added slowly with stirring. Dicyclohexylurea was formed immediately with liberation of heat. The mixture was set aside overnight at room temperature. The urea was filtered off, acetic acid added to the filtrate, and after 2 hours the further amount of dicyclohexylurea formed was removed by filtration. The filtrate was washed with water, the solvent was removed and the product was distilled to give n-amyl ethyl azidomethylphosphonate, B.P. 82–84°/0.02 mm., $n_D^{19}$ 1.4483 (3.30 g.).

Example 15

Ethyl hydrogen azidomethylphosphonate (3.25 g., 19.7 mmole) was reacted with 2-ethylthioethanol (1.98 g., 18.7 mmole) and dicyclohexylcarbodi-imide (9.6 g., 46.5 mmole) in the manner outlined in Example 14. The product (2.75 g.) was distilled to yield ethyl 2-ethylthioethyl azidomethylphosphonate, B.P. 111–112°/0.15 mm., $n_D^{21}$ 1.4847 (2.68 g.). (Found: C, 33.5; H, 5.9; N, 16.4; 6.4; N, 16.6; P, 12.2; S, 12.6%.)

Example 16

Ethyl hydrogen azidomethylphosphonate (3.0 g., 18.2 mmole), phenol (1.72 g., 18.3 mmole) and dicyclohexylurea were brought into reaction as outlined in Example 14. Distillation of the product yielded ethyl phenyl azidomethylphosphonate, B.P. 110–113°/0.005 mm. (3.50 g.). (Found: C, 45.4; H, 5.5; N, 17.3; P, 10.4%. Calc. for C$_9$H$_{12}$N$_3$O$_3$P: C, 44.8; H, 5.0; N, 17.4; P, 12.8%.)

Example 17

6 g. of sodium ethyl azidomethylphosphonate prepared as in Example 6 were heated with 10 g. of methylene dichloride and 8 g. of benzyl chloride for 6 hours on a steam bath. The mixture was diluted with a further 20 g. of methylene dichloride, washed with 2 portions of 5 mls. of water each and the solvent was evaporated and the residue was distilled. The oil thus obtained was shown by gas-liquid chromatography to contain a small amount of ethyl benzyl azidomethylphosphonate.

Example 18

Diethyl p-aminobenzylphosphonate was diazotised and converted into the azide as follows. The ester (1.0 g.) was dissolved in a solution of 1 ml. conc. H$_2$SO$_4$ and 5 ml. water with warming. The resulting solution was cooled to −5° C. and a solution of NaNO$_2$ (0.35 g.) in water (5 ml.), cooled to 0° C., was added dropwise. After stirring for ½ hour, the excess NaNO$_2$ was destroyed by adding a little urea, which caused the temperature to rise to +7° C. After cooling to −5° C., a solution of sodium azide (0.46 g.) in water (5 ml.) cooled to 0° C. was added dropwise. The solution became turbid almost at once and nitrogen was evolved. Small droplets of an oil started to separate on top of the aqueous solution. After the addition of sodium azide was complete the solution was allowed to warm up slowly to room temperature and stirring was continued for 6 hours. The oily product was extracted with ether (25 ml.), the extract was washed with dilute H$_2$SO$_4$ (5 N, 1× 10 ml.), and then with saturated brine (3 extractions of 5 ml. each), dried, filtered through charcoal and the ether evaporated to give diethyl p-azidobenzylphosphonate as a greenish-yellow oil (1.05 g., 95% yield). The structure was assigned on the basis of elemental analysis, infrared and nuclear magnetic resonance spectroscopy.

Example 19

Chloromethylphosphonic dichloride (16.8 g.) was dissolved in 100 ml. of anhydrous ether and a solution of anhydrous ethanol (4.7 g.) and dry pyridine (8.0 g.) in 100 ml. of anhydrous ether was added dropwise over a period of 30 minutes while the reaction mixture was being stirred and cooled in tap water. When the addition was finished, stirring was continued for another 30 minutes, the mixture filtered and washed on the filter with 50 ml. of anhydrous ether. The filtrate was evaporated down and the residue distilled in vacuo to yield 12.7 g. (72% of theory) of ethyl chloromethylphosphonochloridate, B.P. 82–84° C./0.3 mm. Hg.

Example 20

Ethyl chloromethylphosphonochloridate as obtained in Example 19 (17.7 g.) was added dropwise to 200 ml. of cold water while stirring mechanically. The mixture was then heated slightly on the waterbath until all the chloride had reacted. The solution was then neutralised to phenolphthalein with 1 N sodium hydroxide and the solution evaporated to dryness in vacuo. The residue of ethyl sodium chloromethylphosphonate and sodium chloride was extracted with hot ethanol which dissolved the ethyl sodium chloromethylphosphonate, but left the sodium chloride largely undissolved. The ethanol extract was evaporated to dryness and the residue of ethyl sodium chloromethylphosphonate rendered free of water by azeotropic distillation with toluene.

Example 21

Ethyl sodium chloromethylphosphonate as obtained in Example 20 (18.1 g.) and sodium azide (7.8 g.) were suspended in 70 ml. of dimethylformamide and the mixture was stirred mechanically while being heated in an oil-bath at 140° C. under a reflux condenser for 4 hours. The dimethylformamide was then removed by distillation in vacuo, the residue extracted with anhydrous ether to remove ether-soluble impurities and residual solvent and then with boiling absolute ethanol to extract ethyl sodium azidomethylphosphonate from sodium chloride and unreacted sodium azide. The ethanol was removed by distillation under reduced pressure to leave a residue of substantially pure ethyl sodium azidomethylphosphonate.

Example 22

Ethyl sodium azidomethylphosphonate as obtained in Example 21 (18.7 g.) was suspended in 100 ml. of methylene chloride. The mixture was cooled in an ice-bath and stirred mechanically while thionyl chloride (30 g.) was added dropwise over a period of 30 minutes. The mixture was left at room temperature for a further 30 minutes and then filtered from sodium chloride. The filtrate was placed under vacuum at room temperature until excess thionyl chloride and solvent had distilled off. A further 50 ml. of methylene chloride was added to the residue and the distillation at room temperature repeated. The residual oil was shown by nuclear magnetic resonance spectroscopy and infrared analysis to be azidomethylphosphonic dichloride.

Example 23

Azidomethylphosphonic dichloride (obtained from 18.7 g. of ethyl sodium azidomethylphosphonate as described in Example 22) was dissolved in 50 ml. of methylene chloride and this solution was added dropwise with cooling to 100 ml. of absolute methanol through which dry nitrogen was passed by means of a sintered glass disc. When all the chloride had been added the mixture was left at room temperature for 1 hour, at 30° C. for 30 minutes and at 50° C. for 30 minutes, while all the time nitrogen was being passed through the solution. The mixture was then placed under vacuum at 50° C. until methylene chloride and methanol had distilled off. The residual crude liquid was distilled in vacuo to yield 14.2 g. (86% of theory) of dimethyl azidomethylphosphonate of B.P. 68–69° C./0.2 mm. Hg.

Example 24

Diethyl azidomethylphosphonate (0.75 g.) plus 0.1 cc. of "Lubrol" MOA (registered trademark) which is a long chain fatty alcohol/ethylene oxide condensate with a relatively short polyethylene glycol chain, was diluted to 15 cc. with a 0.25% solution of "Lubrol" E which is an alkyl phenol condensed with ethylene oxide having a low water content. This 5% emulsion was used as a stock formulation for diluting with tap water for the biological tests.

French bean plants with leaves cut to 1" square were infested with approximately 30 adult mites of *Tetranychus telarius* each. 24 hours after infestation, the leaves of two plants per treatment were sprayed with the following concentrations of the active compound: 0.01%, 0.02%, 0.04%, 0.1% w./v. 4 days after spraying, the live and dead adult mites were counted; the control attained is given in Table 1, column "adults" as percentage mortality.

To test the effect on eggs and nymphs of *Tetranychus telarius*, French bean plants were then cut and infested again, as in the adult test; two days after infesting, all adult mites were removed and 2 plants per treatment were sprayed with diethyl azidomethylphosphonate solutions (0.01%, 0.02%, 0.04% and 0.1% w./v.). Six days after spraying, live and dead nymphs and eggs were counted. Results, expressed as percentage mortality are also given in Table 1.

A further experiment was carried out in the same manner but on adults with purified diethyl azidomethylphosphonate.

TABLE 1

| | Percent Mortality | | |
|---|---|---|---|
| | Adults | Nymphs | Eggs |
| Concentration, percent w./v. of crude ester: | | | |
| 0.01 | 28.1 | No test | No test |
| 0.02 | 45 | 60.5 | 2.6 |
| 0.04 | 97 | 62.1 | 32.4 |
| 0.10 | 100 | 100 | 85 |
| Control (water and emulsifiers only) | 5.7 | 3.2 | 2.5 |
| Purified ester, percent w./v. diethyl azidomethylphosphonate: | | | |
| 0.01 | 53 | | |
| 0.025 | 63 | | |

The systemic action of diethyl azidomethylphosphonate on *Tetranychus telarius* was then tested as follows: French bean plants growing in pots were infested with adult mites of *Tetranychus telarius*. 24 hours after infestation, the soil around three plants per treatment was watered once with 20 ml. of stock emulsion of pure diethyl azidomethylphosphonate diluted to 0.05% and 0.1% w./v. 2 days after watering the live and dead adult mites were counted; the control achieved is given in Table 2.

Table 2.—Systemic action on *Tetranychus telarius*

| Conc., percent w./v. diethyl azidomethylphosphonate: | Percent mortality, adult mites |
|---|---|
| 0.05 | 63.6 |
| 0.10 | 75.3 |

Example 25

The biological effect of diethyl azidomethylphosphonate on *Calandra granaria* was tested by the two following methods:

Method 1.—Approximately 4 g. of wheat and 20 adult *Calandra granaria* each were placed in two Petri dishes (2½" diameter) and sprayed with 0.04% w./v. and 0.1% w./v. respectively aqueous solutions of diethyl azidomethylphosphonate using a spray gun. Immediately after spraying the lid was placed on the Petri dishes. A mortality count was done on both populations on the 3rd day. This test demonstrated the combined contact and fumigant action of the insecticide.

Method 2.—Four 4" square glass plates per each treatment were sprayed with 3 ml. each of 0.04%, 0.02%, 0.1% and 0.01% w./v. aqueous solutions of diethyl azidomethylphosphonate using a Potter tower. After the plates had dried a polytetrafluoroethylene coated glass ring 1¾" diameter, 1" deep was placed on each plate; 10 adult *Calandra granaria* were introduced into each ring. A mortality count was done on the 3rd day. This test demonstrated contact action only.

Results are given in Table 3.

TABLE 3

| | Percent Mortality | |
|---|---|---|
| | Method 1 | Method 2 |
| Concentration, percent w./v.: | | |
| 0.01 | No test | 8 |
| 0.02 | No test | 10 |
| 0.04 | 100 | 18 |
| 0.10 | 100 | 40 |

Example 26

Three cabbage plants, three weeks old, were each sprayed to drip point with the following concentrations of diethyl azidomethylphosphonate: 0.1%, 0.04%, 0.02% and 0.01% w./v. The plants were allowed to dry; then lots of 4 leaves from each plant were put into eight separate Petri dishes (2½" diameter), each of which dishes contained a population of 10 larvae (5 weeks old) of *Plutella maculipennis*. Mortality counts were taken on the 1st and 2nd day. Using the same method, the test was then repeated on 8 further dishes using leaves treated with the following concentrations of diethyl azidomethylphosphonate: 0.1%, 0.04%, 0.03%, 0.02% w./v. (2 dishes per treatment). Results, expressed as percent mortality are given in Table 4.

TABLE 4

| | Percent Mortality | |
|---|---|---|
| | 1st Test | 2nd Test |
| Concentration, percent w./v.: | | |
| 0.1 | 100 | 100 |
| 0.04 | 70 | 90 |
| 0.03 | | 70 |
| 0.02 | 45 | 55 |
| 0.01 | 25 | |
| Control (water and emulsifiers only) | | |

In addition a systemic test was carried out as follows:

An aqueous solution of 0.1% w./v. diethyl azidomethylphosphonate was prepared and 20 ml. were watered once on to the soil around cabbage plants in pots. The plants were heavily infested with larvae of *Plutella maculipennis*. Two days after this treatment there was a 92% mortality of larvae on treated plants compared with 7% on untreated plants.

Example 27

A glass tube 6" by 2½" was placed in an upright position on several thicknesses of filter paper in a Petri dish. A piece of cotton wool soaked in a solution of sugar and milk was placed inside the tube so that it rested on the filter paper at the bottom of the tube. 10 newly emerged adult houseflies (*Musca domestica*) were placed inside the tube, the top of which was sealed with a piece of muslin. The flies were sprayed through the muslin using a spray gun containing diethyl azidomethylphosphonate in the concentrations 0.04%, 0.02% and 0.01% w./v. Mortality counts were taken after 24 hours; results are listed in Table 5.

Table 5

| Concentration, percent w./v.: | Percent mortality |
|---|---|
| 0.04 | 100 |
| 0.02 | 25 |
| 0.01 | 0 |
| Control (water and emulsifiers only) | 0 |

Example 26

A piece of filter paper was placed at the bottom of a 1 lb. open glass jar, about 20 adult *Lucilia cuprina* are introduced into it and the top was sealed with muslin. Diethyl azidomethylphosphonate (0.04% w./v. aqueous emulsion) was sprayed on from a spray gun. Mortality counts were taken after 24 hours; results expressed as percent mortality are given in Table 6.

Table 6

Concentration, percent w./v.:     Percent mortality
0.04 ------------------------------------ 100
    Control (water and emulsifiers) _____ 0

The effect on larvae was tested as follows:

A stock solution of 0.5% w./v. diethyl azidomethylphosphonate was serially diluted in sheep serum in test tubes to give the following range of concentrations: 0.05, 0.1, 0.2, 0.4, 1, 4, 8, 64, 100 and 1000 p.p.m. To each test tube was added the same amount of cotton wool to absorb the 1 ml. of serum and chemical therein. Then larvae of *Lucilia cuprina* were added to each tube. The cotton wool prevented the larvae from drowning in the serum but at the same time allowed full contact between them and the chemical. Within 24 hours it was observed that there was 100% kill of larvae at the concentration of 4 p.p.m. of the chemical and all higher concentrations, whereas there was less than 5% kill in tubes containing no chemical.

Example 29

The stem of a rose bud infested with aphids (*Aphis rosae*) was placed in a flask (500 mls.), the bottom of which was covered with 1 inch of water and the neck of which was sealed with cotton wool. The bud was sprayed to drip point with a spray gun with aqueous solutions of diethyl azidomethylphosphonate using concentrations of 0.04%, 0.02% and 0.01% w./v. Percent mortality as assessed after 4 days is given in Table 7 under "Contact."

To test systemic action, in a further experiment, 100 ccs. of each of the following concentrations of diethyl azidomethylphosphonate were made up in flasks: 0.04%, 0.02% and 0.01% w./v.; the bottom end of the stem of a rose bud heavily infested with aphids (*Aphis rosae*) was immersed to a depth of ½ cm. in the solution of each flask. Results are given in Table 7 under "Systemic."

A second series of identical tests was then carried out using, however, the concentrations 0.01, 0.025, 0.05 and 0.10% w./v. Percent mortality was again assessed on the 2nd day and recorded in Table 7.

TABLE 7

|  | Percent Mortality | |
| --- | --- | --- |
|  | Contact | Systemic |
| Concentration, percent w./v.: | | |
| 0.01 | 0 | 25 |
| 0.02 | 50 | 75 |
| 0.04 | 100 | 100 |
| Second Series: | | |
| 0.01 |  | 50 |
| 0.025 | 75 | 100 |
| 0.05 | 100 | 100 |
| 0.10 | 100 | 100 |

Example 30

A heavy infestation of green peach aphids (*Myzus persicae*) was established on cabbage plants (approximately 8 inches tall and each having 8 to 10 leaves) growing singly in soil in pots. The soil around three plants per treatment was watered once with 20 ml. of an aqueous solution at the concentration 0.0125, 0.025, 0.05 and 0.1% w./v. of diethyl azidomethylphosphonate. After 24 hours mortality in all cases was 100%.

Example 31

A group of cabbage plants infested with green peach aphids as described in Example 30 together with their pots was covered over with polyethylene sheet except that the third leaf from the bottom of each plant was left exposed. These units were then placed on a turntable and sprayed with an aqueous solution of diethyl azidomethylphosphonate formulated as in Example 24 at the following concentrations: 0.0125%, 0.025%, 0.05% and 0.1% w./v. The spray contacted only the third leaf as described. After 24 hours it was observed that at all concentrations 100% mortality of aphids was achieved both on the sprayed leaf and all the other unsprayed leaves of each plant.

Example 32

Potato seedlings 9 inches high growing in pots were each infested with 40 mealy-bugs (*Pseudococcus adonidum*). Twenty-four hours later three seedlings were sprayed with 0.05% w./v. diethyl azidomethylphosphonate formulated as in Example 24, and three further seedlings—controls—were sprayed with water containing the same concentrations of surfactants but without the phosphonate. After 24 hours, there was 100% kill of mealy-bugs from the phosphonate treatment and 3% kill from the surfactant controls.

Example 33

Methyl ethyl azidomethylphosphonate was formulated with "Lubrol" MOA and "Lubrol" E as described in Example 24 and diluted with water to the concentrations of 0.2% and 0.7% w./v. of the active ingredient. Activity against adult *Lucilia cuprina* was then tested with these 2 solutions as described in Example 28 and mortality was found to be greater than 95% at both concentrations. Activity against *Plutella maculipennis* was tested with one solution only at the lower concentration as described in Example 26 and mortality was found to be in excess of 50% at 0.07% w./v. Activity against *Calandra granaria*, tested with one solution only at the lower concentration as described in Example 25 (Method 1), was found to produce mortality in excess of 50%. In addition activity against larvae of *Lucilia cuprina* was determined as described in Example 28 over a range of concentrations from 0.05 to 1000 p.p.m. as stated. At 64 p.p.m. and higher concentrations mortality was 100%.

Systemic action against aphids on cabbage plants approximately 8 inches tall and having 8 to 10 leaves was determined by watering the soil around each plant once with 20 mls. of an aqueous solution of diethyl azidomethylphosphonate. Percent mortality of adults after three days was 75% when a concentration of 0.025% w./v. was used and 100% when it was 0.05 and 0.10% w./v. Systemic action against *Tetranychus telarius* when tested as decribed in Example 24 was 66% of adult mites at a concentration of 0.05 and 85% of adult mites at 0.1% w./v. Four mice fed with 250 mg. of methyl ethyl azidomethylphosphonate per kg. of bodyweight survived the treatment without apparent effect.

Example 34

Methyl isopropyl azidomethylphosphonate was formulated with "Lubrol" MOA and "Lubrol" E as described in Example 24 and diluted with water to the concentrations of 0.2% and 0.07% w./v. of the active ingredient. Activity against *Lucilia cuprina*, *Plutella maculipennis*, *Calandra granaria* and *Tetranychus telarius* adults was tested as described in Examples 24, 25, 26 and 28 respectively for diethyl azidomethylphosphonate. Results expressed as percent mortality are given in Table 8.

TABLE 8

| Concentration: | Species | Percent Mortality |
|---|---|---|
| 0.2% w./v. | Lucilia cuprina | Greater than 95. |
| | Plutella maculipennis | Greater than 100. |
| | Calandra granaria | Greater than 95. |
| 0.07% w./v. | Lucilia cuprina | Greater than 95. |
| | Tetranychus telarius | Greater than 80. |
| | Plutella maculipennis | Greater than 95. |
| | Calandra granaria | Greater than 50. |
| 0.12% w./v. by spraying as in Example 24 | Tetranychus telarius | Greater than 90. |
| 50 mg./kg. bodyweight per os | 4 mice | Survived without after-effect. |

Example 35

Di-isopropyl azidomethylphosphonate, formulated with "Lubrol" MOA and "Lubrol" E as described in Example 24, was diluted with water to give 0.1 and 0.03% w./v. of the active ingredient in water. The activity of this formulation when applied directly as a spray against red spider (*Tetranychus telarius*) was then tested as described for diethyl azidomethylphosphonate in Example 24 for adults. The percentage mortality was better than 50% at both 0.1% and 0.03% w./v. concentrations. Activity of the same compound and formulation against *Calandra granaria* was then tested as described in Example 25 for diethyl azidomethylphosphonate, Method 1. A mortality of better than 95% was obtained at a concentration of 0.1% w./v. Repeating with the same compound (di-isopropyl azidomethylphosphonate) and formulation, the experiment described in Example 26 for diethyl azidomethylphosphonate (formulation sprayed directly on cabbage plants) the mortality of *Plutella maculipennis* was found to be better than 95% at the lower dosage level, namely 0.03% w./v. active ingredient. Finally, using di-isopropyl azidomethylphosphonate instead of diethyl azidomethylphosphonate, Example 28 was repeated and the mortality of adult *Lucilia cuprina* was found to be better than 95% for both concentrations, 0.1% and 0.03% w./v.; the morality of larvae was found to be better than 50% at the concentration of 25 p.p.m. w./v.

Example 36

A mixture of diethyl 1-azido-2-hydroxy-1-phenylethylphosphonate and diethyl 2-azido-1-hydroxy-1-phenylethylphosphonate was prepared as follows. A solution of magnesium perchlorate was prepared by dissolving its monohydrate (2.4 g.) in water (8 ml.). This solution was cooled to 0° C. on an ice-bath and sodium azide (1.30 g.) was added. A mixture of diethyl 1-phenylvinyl phosphate and diethyl 1,2-epoxy-1-phenylethylphosphonate (5.12 g.) was added, with stirring, to the cooled (0° C.) solution of sodium azide/magnesium perchlorate. After stirring for ½ hour, the emulsion was allowed to warm to room temperature and sufficient dioxan (8 ml.) and water (3 ml.) added to give a homogenous solution. This solution was allowed to stand overnight at room temperature. During this period of time the solution became reddish and a gas was being evolved from the solution.

The reaction mixture was diluted with water (50 ml.) and then extracted twice with ether, the ether extracts were combined and washed with aqueous sodium chloride solution, ferrous sulphate solution (twice) and then brine again, dried over $Na_2SO_4$ and the solvent was evaporated to give a dark brown viscous oil (4.95 g.). Found: N 3.84%, Calc. for $C_{12}H_{18}N_3O_4O$: N, 14.0%. On basis of the analysis, the crude product contained about 27% of the mixed azidophosphonates of diethyl 1-azido-2-hydroxy-1-phenylethylphosphonate and diethyl 2-azido-1-hydroxy-1-phenylethylphosphonate. The mixture was formulated with "Lubrol" MOA and "Lubrol" E as described in Example 24 for diethyl azidomethylphosphonate. This formation was then tested against red spider adults (*Tetranychus telarius*) as set out in Example 24; mortality was found to be better than 50% at a concentration of 1% w./v. of the crude oil, i.e. 0.27% w./v. of the mixture.

Example 37

30 adult cattle ticks were treated with diethyl azidomethylphosphonate (0.01 and 0.1% w./v. aqueous solutions) by the micro-syringe technique. The active compound used was of high purity.

One microdrop (freely falling) from a micro-syringe having a carefully cleaned needle of 0.15 mm. internal bore and 0.4 mm. external diameter was dropped onto the ventral portion of each tick to be treated. The ticks were then observed for 48 hours and a mortality count was done. In a similar manner larvae were treated and their mortality was determined. Results are given in Table 9.

TABLE 9

| Number of Animals: | Concentration of mixture percent w./v. | Percent Mortality |
|---|---|---|
| 30 adult ticks | 0.1 | 100 |
| Do | 0.01 | 45 |
| 30 ticks larvae | 0.1 | 100 |
| Do | 0.01 | 94 |

Example 38

Sodium (33 mg.) was dissolved in n-butanol (10 ml.) and to this solution was added diethyl azidomethylphosphonate (1 ml.). The solution was heated under reflux for 2 hours. Gas-liquid chromatography showed that virtually all of the diethyl ester had disappeared, while n-butyl ethyl azidomethylphosphonate and (in lesser amount) di-n-butyl azidomethylphosphonate were present.

Example 39

Aqueous solutions of methyl isobutyl azidomethylphosphonate at a concentration of 0.025%, 0.05% and 0.1% were applied to the soil around cabbage plants infested with green peach aphids (*Myzus persicae*) as in Examle 30. After 24 hours the mortality of aphids was 50, 75 and 100% respectively.

Example 40

Methyl isobutyl azidomethylphosphonate was tested against larvae of *Lucilia cuprina* as described in the larval test of Example 28. 100% kill was obtained at 64 p.p.m.

Example 41

Methyl n-propyl azidomethylphosphonate was formulated as described in Example 24 and diluted with water to 0.1% w./v. of the active ingredient. Activity against *Lucilia cuprina* adults, *Calandra granaria* and *Tetranychus telarius* was determined as described in Examples 28, 25 (Method 1) and 24 (directly sprayed on to infested plant) respectively for diethyl azidomethylphosphonate. Mortality was greater than 95% for *Lucilia cuprina*, greater than 75% for *Calandra granaria* and greater than 75% for *Tetranychus telarius*.

Aqueous solutions of this compound were tested against *Lucilia cuprina* larvae, *Aphis rosae* and *Myzus persicae* according to the techniques in Examples 28, 29 (for systemic action) and 30 (for systemic action) respectively. Results expressed as percent mortality are given in Table 10.

TABLE 10

| Species | Concentration | Percent Mortality |
|---|---|---|
| Aphis rosae (adults) systemic action | 16 p.p.m. | 100 |
| | 0.01% w./v. | 75 |
| | 0.025% w./v. | 90 |
| | 0.05% w./v. | 100 |
| | 0.10% w./v. | 100 |
| Myzus persicae (adults) systemic action | 0.025% w./v. | 75 |
| | 0.05% w./v. | 75 |
| | 0.10% w./v. | 100 |
| Lucilia cuprina (larvae) | | |

Example 42

The experiment of Example 38 was repeated, the mixture being heated at 100° C. in a slow stream of nitrogen. After 5 hours, gas-liquid chromatography showed diethyl azidomethylphosphonate, n-butyl ethyl azidomethylphosphonate and di-n-butyl phosphonate to be present in the relative molar proportions 23:42:6.

Example 43

For toxicity tests on each of the compounds of Table 11, four healthy adult mice were weighed and treated as follows. Aqueous solutions of the compound at the concentration stated in Table 11 were prepared and intubated into the stomachs of the animals by means of a metal syringe fitted with a metal catheter. The mice were observed over one week and any macroscopic effects were recorded. Results are given in Table 11.

TABLE 11

| Compound | Concentration of aqueous solution percent w./v. | Dosage, mg./kg. body-weight | No. of mice | Effect |
|---|---|---|---|---|
| Diethyl azidomethylphosphonate | 2 | 200 | 4 | No effect, alive. |
| | | 2,000 | 4 | 3 dead, 1 alive. |
| Ethyl methyl azidomethylphosphonate | 2 | 250 | 4 | No effect, alive. |
| | | 1,000 | 4 | 2 dead, 2 alive. |
| Isopropyl methyl azidomethylphosphonate | 2 | 50 | 4 | No effect, alive. |
| | | 200 | 4 | 3 dead, 1 alive. |
| Di-isopropyl azidomethylphosphonate | 2 | 200 | 4 | No effect, alive. |
| Methyl isobutyl azidomethylphosphonate | 2 | 1,000 | 4 | Do. |
| Methyl n-propyl azidomethylphosphonate | 2 | 100 | 4 | No effect, alive. |
| | | 500 | 4 | 2 dead, 2 alive. |
| Sec. butyl ethyl azidomethylphosphonate | 2 | 1,000 | 4 | No effect, alive. |
| Ethyl 2-chloroethyl azidomethylphosphonate | 2 | 1,000 | 4 | Do. |

Example 44

Bis($\beta$ - chloroethyl) chloromethylphosphonate (5 g.) and sodium azide (30 g.) were heated for 5 hours under reflux in 80 ml. of dimethylformamide. The solvent was then removed by distillation under reduced pressure. The residue was extracted with hot absolute ethanol, filtered and the filtrate was evaporated to dryness to yield sodium $\beta$-azidoethyl azidomethylphosphonate. An aqueous solution of this salt was passed through an acidic ion exchange column ("Dowex" 50, registered trademark) and the aqueous eluate was evaporated in vacuo to yield 3.6 g. of $\beta$-azidoethyl hydrogen azidomethylphosphonate as a white solid. 3.5 g. of this was heated under reflux for 6 hours with 3 grams of triethyl orthoformate. The reaction mixture was then heated under reduced pressure to remove low-boiling products and the residue was distilled to yield two fractions:

Fraction 1: 1.1 g. B.P. 88–106° C./0.1 mm. Hg
Fraction 2: 1.6 g. B.P. 106° C./0.1 mm. Hg By infrared, gas chromatography and nuclear magnetic resonance analysis, fraction 1 was shown to consist of about 50% and fraction 2 of about 70% pure ethyl $\beta$-azidoethyl azidomethylphosphonate, the balance being ethyl $\beta$-azidoethyl chloromethylphosphonate.

Example 45

A solution of sodium ethyl azidomethylphosphonate in dimethylformamide was prepared as described in Example 7. After the sodium chloride and excess sodium azide had been removed by centrifugation, the dimethylformamide solution and washings were concentrated by distillation at atmospheric pressure to give a final volume of 100 ml. of anhydrous solution. Portions of this stock solution were treated variously as described in Example 46(a) to (d) inclusive below.

Example 46

(a) To a 50 ml. portion of the dimethylformamide stock solution of sodium ethyl azidomethylphosphonate prepared in Example 45 was added ethyl toluene-p-sulphonate (10.6 g.) and the solution was heated in an oil bath at 100° C. Progress of the reaction was followed by gas-liquid chromatography; the amount of ethyl toluene-p-sulphonate decreased steadily while at the same time there was steady formation of diethyl azidomethylphosphonate. After 2 hours reaction appeared to be complete and only 6% of unreacted ethyl toluene-p-sulphonate remained. The solvent was evaporated and the residue was extracted with ether. Distillation of the ether extract gave diethyl azidomethylphosphonate in a yield of 65% overall from diethyl chloromethylphosphonate.

(b) To a 10 ml. portion of the stock solution prepared in Example 45 was added ethyl methanesulphonate (1.4 g.) and the solution was heated on the steam bath for 2 hours. The product, diethyl azidomethylphosphonate, was isolated as described in (a) above.

(c) The experiment described in (b) was repeated, using dimethyl sulphate (1.4 g.) in place of ethyl methanesulphonate. The product, ethyl methyl azidomethylphosphonate, was formed in good yield.

(d) The experiment described in (b) above was repeated, using diethyl sulphate (1.7 g.) in place of ethyl methanesulphonate. The product contained diethyl azidomethylphosphonate in high yield.

Example 47

Diethyl chloromethylphosphonate (5 g.) and sodium chloride (2 g.) were heated in dimethylformamide (50 ml.) under reflux for 24 hours. At intervals of 2, 8 and 24 hours the reflux condenser was replaced by a distillation head and the formed ethyl chloride was distilled out. Analysis of the mixture after 24 hours showed that conversion of the diester to sodium ethyl chloromethylphosphonate was substantially complete. Sodium azide (1.8 g.) was then added and heating under reflux was continued for a further 10 hours. Evaporation of the solvent gave sodium ethyl azidomethylphosphonate in 85% yield.

Example 48

Dimethyl chloromethylphosphonate (15.8 g.) was dissolved in water (300 ml.) containing sodium hydroxide (4 g.) and the solution was heated under reflux for 1 hour. Evaporation of the solvent gave a substantially quantitative yield of sodium methyl chloromethylphosphonate. This salt was dried and was added, together with sodium azide (6.5 g.), to dimethylformamide (150 ml.) and the mixture was heated under reflux for 12 hours. The reaction mixture was worked up as described in Example 7 for the ethyl analogue to give sodium methyl azidomethylphosphonate in 90% yield.

Example 49

Sodium ethyl azidomethylphosphonate (3.15 g.) was covered with benzene (60 ml.) and 40 ml. of solvent was distilled off to remove any trace of water. Ethyl chlorocarbonate (2.20 g.) was added and the suspension was stirred magnetically for 2 hours and was then heated to reflux for 4 hours. Carbon dioxide was evolved. Ethanol (1.2 ml.) was then added and heating to reflux was continued for 2 hours. Filtration, evaporation of solvents and final distillation yielded diethyl azidomethylphosphonate in a yield of 40% based on the initial sodium salt.

Example 50

A mixture of sodium salts of ethyl azidomethylphosphonate (60 parts) and ethyl chloromethylphosphonate (40 parts) (1.4 g. total weight) was suspended in benzene (60 ml.) and two-thirds of the solvent were distilled off to remove the last traces of water from the salts and from the reaction flask. Ethyl chlorocarbonate (0.91 g.) was added and the mixture was stirred for 16 hours. The original salts dissolved and a fine suspension of sodium chloride appeared. Dry ethanol (0.5 ml.) was added and the mixture was heated over a steam bath for 30 minutes. Suspended solids were removed by filtration and the solvents were distilled off, leaving an oil (1.37 g.) which was shown by gas-liquid chromatography and nuclear magnetic resonance spectroscopy to contain diethyl azidomethylphosphonate (59 parts) and diethyl chloromethylphosphonate (41 parts) in a total yield of 45%.

Example 51

Sodium ethyl azidomethylphosphonate (2.5 g.) was suspended in benzene (40 mls.) and 20 mls. of the benzene were distilled off to dry the sample. Dry ethanol (0.65 g.) and ethyl chlorocarbonate (1.5 g.) were added and the suspension was heated on a steam bath for 2 hours. A finely divided suspension of sodium chloride formed during the reaction was removed by centrifuging, the liquid centrifugate was evaporated and finally distilled under high vacuum to give diethyl azidomethylphosphonate (20% yield).

Example 52

The experiment described in Example 38 was repeated, but with isobutanol in place of n-butanol. After 5 hours at 100° C., the relative molar proportions of diethyl azidomethylphosphonate, ethyl isobutyl azidomethylphosphonate and di-isobutyl azidomethylphosphonate present in solution was 21:33:6.

Example 53

To ethyl sodium azidomethylphosphonate (112 g.) suspended in anhydrous ether (150 ml.) was added dropwise, with stirring, thionyl chloride (90.2 g.) in ether (50 ml.) at −10° C. while cooling the reaction vessel in a solid carbon dioxide-acetone bath. After the addition was complete stirring was continued at room temperature for two hours and then the mixture was refluxed for 1½ hours. After the solution had cooled sodium chloride was filtered off and washed well with ether. The ether was then distilled off under reduced pressure. Yield of crude ethyl azidomethylphosphonochloridate was 95 g. (69% of theory). Nuclear magnetic resonance spectroscopy showed that the product was 90% pure and contained azidomethylphosphonic dichloride as the main impurity.

Example 54

To ethyl sodium azidomethylphosphonate (20 g.) was added dropwise with shaking excess thionyl chloride (51 g.). After the addition the mixture was refluxed on a boiling water bath for 4 hours. The reaction mixture was filtered and the sodium chloride was washed well with anhydrous ether. The ether and excess thionyl chloride were removed under reduced pressure from a steam bath. Crude yield was 12.6 g. (68% of theory). Infrared spectrographic analysis showed the sample to be azidomethylphosphonic dichloride contaminated with 5–10% ethyl azidomethylphosphonochloridate.

Example 55

Ethyl azidomethylphosphonochloridate (9.18 g., 0.05 mole) was dissolved in ether (25 ml.) and added dropwise to an ether (100 ml.) solution of diethyl malate (9.5 g., 0.05 mole) and triethylamine (5.1 g., 0.05 mole) with stirring. During the addition, the temperature of the reaction mixture was maintained between −10° and −20° C. While stirring continued, the reaction mixture was then allowed to come to room temperature over a period of two hours, and kept at room temperature for four hours. Triethylamine hydrochloride, which separated out during the reaction, was filtered off, and washed with ether. Ether was removed from the combined filtrate and washings to give 16.0 g. (94% crude yield) of the crude product. The crude product was dissolved in ether, and the resulting ether solution was washed twice with water. The ether solution was dried over anhydrous sodium sulphate, and the ether removed by distillation. The product was distilled to yield ethyl 1,2-di(ethoxycarbonyl) ethyl azidomethylphosphonate, B.P. 82°/0.4 mm. Hg.

Example 56

Benzyl alcohol and ethyl azidomethylphosphonochloridate were reacted in a similar manner to that of Example 55 to give benzyl ethyl azidomethylphosphonate. The crude material was treated with petroleum ether to remove unreacted benzyl alcohol.

Example 57 p-Nitrophenol and ethyl azidomethylphosphonochloridat were reacted in a manner similar to that of Example 55 to give ethyl p-nitrophenyl azidomethylphosphonate, which was obtained as a viscous oil.

Example 58

2-chloroethanol and ethyl azidomethylphosphonochloridate were reacted in a manner similar to that of Example 55, except that the water wash of the ether solution was omitted, to give 2-chloroethyl ethyl azidomethylphosphonate, B.P. 93–104°/0.05–0.08 mm. Hg.

Example 59

Cyclohexanol and ethyl azidomethylphosphonochloridate were reacted in a manner similar to that of Example 55 to give cyclohexyl ethyl azidomethylphosphonate, B.P. 118–9°/0.1 mm. Hg.

Example 60

Ethyl azidomethylphosphonochloridate (12.9 g., 0.07 mole) was dissolved in ether (25 ml.) and added dropwise, with stirring, over a period of one hour, to a solution of sec. butanol (5.19 g. 0.07 mole) and triethylamine (7.09 g., 0.07 mole) in ether (100 ml.). During the addition the temperature of the reaction mixture was maintained between −10° and −20° C. While stirring continued, the reaction mixture was then allowed to come to room temperature and kept at room temperature for 4 hours. Triethylamine hydrochloride, which had separated out, was filtered off. The ether solution was treated with water to remove any unreacted ethyl azidomethylphosphonochloridate and dried over anhydrous sodium sulphate. The ether was distilled off to leave 12.7 g.

(80%) crude product. Distillation yielded 8.4 g. (54%) of sec. butyl ethyl azidomethylphosphonate (B.P. 89–91°/ 0.09 mm. Hg). Analysis by infrared and nuclear magnetic resonance spectroscopy confirmed the structure.

Example 61

Tert. butanol and ethyl azidomethylphosphonochloridate were reacted in a similar manner to that of Example 58 to give tert. butyl ethyl azidomethylphosphonate.

Example 62

Allyl alcohol and ethyl azidomethylphosphonochloridate were reacted in a manner similar to that of Example 58 to give allyl ethyl azidomethylphosphonate, B.P. 80–98°/0.7–0.9 mm. Hg.

Example 63

Prop-2-yn-1-ol and ethyl azidomethylphosphonochloridate were reacted in a manner similar to that of Example 58 to give crude ethyl prop-2-yn-1-yl azidomethylphosphonate.

Example 64

Triethylamine (14.7 g.) and ether (400 ml.) were placed in a 2 litre flask, fitted with a condenser, stirrer and two dropping funnels, one containing azidomethylphosphonic dichloride (12.6 g.) in ether (90 ml.) and the other butan-2,3-diol (6.53 g.) in ether (90 ml.). The system was cooled to −10° C. and both funnels set dropping simultaneously at a slow rate while stirring the reaction mixture. Stirring was continued for several hours and the reaction mixture was then left standing for 48 hours. The mixture was filtered to remove triethylamine hydrochloride and the solid washed well with anhydrous ether. The ether was removed from the filtrate under reduced pressure to yield a yellow oil (9.6 g., 70%), identified by nuclear magnetic resonance and infra-red spectroscopic analyses as crude 2,3-butylene azidomethylphosphonate. After distillation at 110–114°/0.05 mm., the yield of pure product was 3.75 g. (30%).

Example 65

To ethanethiol (3.76 g.) and triethylamine (4.05 g.) in ether (30 ml.) was added dropwise with stirring azidomethylphosphonic dichloride (3.48 g.) prepared as described in Example 54 while cooling the system at −10° C. After the addition, stirring was continued at room temperature for 1½ hours. The mixture was filtered and washed well with anhydrous ether. The ethereal extract was shaken with charcoal, filtered, and the ether and excess ethanethiol were removed under reduced pressure to yield a clear yellow oil (2.7 g.). Nuclear magnetic resonance spectroscopic analysis indicated that the sample contained 77% of diethyl azidomethylphosphonodithiolate.

Example 66

To ethanethiol (6.3 g.) and triethylamine (10.1 g.) in ether (75 ml. was added ethyl azidomethylphosphonochloridate (18.4 g.) in ether (20 ml.) dropwise with stirring, while cooling the mixture in a Dry Ice/acetone bath to −15° C. Addition was carried out over 45 minutes, when a yellow colour appeared. Stirring was continued at room temperature for 4 hours. The ether was removed under reduced pressure to yield a red oil which was distilled at 72–80°/0.05 mm. giving O,S-diethyl azidomethylphosphonothiolate, 8.4 g. (40%). Nuclear magnetic resonance spectroscopic analysis showed the sample to be 92% pure.

Example 67

To diethylaminoethanol (9.4 g.) in ether (40 ml.) there was added dropwise, with stirring, ethyl azidomethylphosphonochloridate (5 g.) in ether (10 ml.), with cooling at −15° C. Addition was made over 1½ hours, stirring was continued while the mixture was allowed to warm to room temperature and then the mixture was left standing overnight. The solution was filtered, washed with ether and the hygroscopic solid collected. This was identified by infra-red and nuclear magnetite resonance spectroscopic analysis as diethyl(2-hydroxyethyl)ammonium chloride. The ether washings were combined with the filtrate and the ether removed under reduced pressure from a water bath to yield an amber coloured oil. Yield of crude 2-diethylaminoethyl ethyl azidomethylphosphonate was 6.12 g. (75% of theory). Nuclear magnetic resonance spectroscopic analysis indicated this sample to be about 80% pure. The structure was confirmed by the infra-red spectrum as well as the nuclear magnetic resonance spectrum.

Example 68

Hydrogen isopropyl azidomethylphosphonate (8.95 g., 0.05 mole), triethyl orthoformate (7.4 g., 0.05 mole) and re-distilled n-hexanol (51 g., 10 equivalents) were mixed together and heated on a water bath for 7 hours. Excess n-hexanol and other low-boiling materials were removed by distillation under reduced pressure, leaving the crude product, which was distilled, B.P. 211°/0.4 mm. Hg, yielding hexyl isopropyl azidomethylphosphonate in 50% yield. The structure was confirmed by infra-red and nuclear magnetic resonance spectroscopy.

Examples 69 to 98

The synthesis of Examples 69 to 98 inclusive were carried out from the intermediates listed in a manner similar to the examples quoted in Table 12.

TABLE 12

General formula

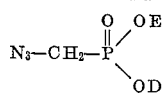

| Example: | E | D | Synthesised according to Example | From Intermediates |
|---|---|---|---|---|
| 69 | n-Propyl | Ethyl | 10 | n-Propyl hydrogen azidomethylphosphonate and triethyl orthoformate. |
| 70 | do | n-Propyl | 10 | n-Propyl hydrogen azidomethylphosphonate and tri-n-propyl orthoformate. |
| 71 | Isopropyl | Ethyl | 10 | Isopropyl hydrogen azidomethylphosphonate and triethyl orthoformate. |
| 72 | n-Butyl | do | 10 | n-Butyl hydrogen azidomethylphosphonate and triethyl orthoformate. |
| 73 | n-Amyl | do | 60 | Ethyl azidomethylphosphonochloridate and n-amyl alcohol. |
| 74 | 3,5,5-trimethylhexyl | do | 60 | Ethyl azidomethylphosphonochloridate and 3,5,5-trimethylhexanol. |
| 75 | do | Methyl | 60 | Methyl azidomethylphosphonochloridate and 3,5,5-trimethylhexanol. |
| 76 | n-Dodecyl | do | 60 | Methyl azidomethylphosphonochloridate and n-dodecanol. |
| 77 | do | Ethyl | 60 | Ethyl azidomethylphosphonochloridate and n-dodecanol. |
| 78 | 2-ethylthioethyl | do | 60 | Ethyl azidomethylphosphonochloridate and 2-(ethylthio)ethanol. |
| 79 | 3-pentyl | do | 60 | Ethyl azidomethylphosphonochloridate and 3-pentanol. |
| 80 | Isobutyl | do | 60 | Ethyl azidomethylphosphonochloridate and isobutanol. |
| 81 | 2-cyanoethyl | do | 60 | Ethyl azidomethylphosphonochloridate and 2-cyanoethanol. |

TABLE 12—Continued

| E | D | Synthesised according to Example | From Intermediates |
|---|---|---|---|
| 82. Sec. butyl | Isopropyl | 60 | Isopropyl azidomethylphosphonochloridate and sec. butanol. |
| 83. do | Sec. butyl | 60 | Sec. butyl azidomethylphosphonochloridate and sec. butanol. |
| 84. 2-chloroethyl | do | 60 | Sec. butyl azidomethylphosphonochloridate and 2-chloroethanol. |
| 85. n-Butyl | Isopropyl | 60 | Isopropyl azidomethylphosphonochloridate and n-butanol. |
| 86. 2-pentyl | Ethyl | 60 | Ethyl azidomethylphosphonochloridate and 2-pentanol. |
| 87. 2-ethoxyethyl | do | 60 | Ethyl azidomethylphosphonochloridate and 2-ethoxyethanol. |
| 88. 2-octyl | do | 60 | Ethyl azidomethylphosphonochloridate and 2-octanol. |
| 89. Phenyl | Methyl | 9 | Phenyl hydrogen azidomethylphosphonate and diazomethane. |
| 90. do | Ethyl | 10 | Phenyl hydrogen azidomethylphosphonate and triethyl orthoformate. |
| 91. 3-chloropropyl | do | 60 | Ethyl azidomethylphosphonochloridate and 3-chloropropanol-1. |
| 92. 2-methyl-3,3,4,4-tetrafluorobutyl-2 | do | 60 | Ethyl azidomethylphosphonochloridate and 2-methyl-3,3,4,4-tetrafluoro-2-butanol. |
| 93. 3,3,4,4-tetrafluorobutyl-2 | do | 60 | Ethyl azidomethylphosphonochloridate and 3,3,4,4-tetrafluoro-2-butanol. |
| 94. 2,2,2-trichloroethyl | do | 60 | Ethyl azidomethylphosphonochloridate and 2,2,2-trichloroethanol. |
| 95. 2,2,2-trifluoroethyl | do | 60 | Ethyl azidomethylphosphonochloridate and 2,2,2-trifluoroethanol. |
| 96. 2-nitrobutyl | do | 60 | Ethyl azidomethylphosphonochloridate and 2-nitro-1-butanol. |
| 97. 2-methyl-2-nitropropyl-1 | do | 60 | Ethyl azidomethylphosphonochloridate and 2-methyl-2-nitro-1-propanol. |
| 98. 1,1,1-trichloro-3-nitropropyl-2 | do | 60 | Ethyl azidomethylphosphonochloridate and 1,1,1-trichloro-3-nitro-2-propanol. |

Example 99

S-sec. butyl O-ethyl azidomethylphosphonothiolate, B.P. 120–125°/0.2 mm., was prepared as described for the diethyl ester in Example 66 from ethyl azidomethylphosphonochloridate by reaction with one equivalent of sec. butanethiol.

Example 100

Diethyl 1-azidoethylphosphonate, B.P. 58°/0.1 mm., $n_D^{24}$ 1.4390, was prepared from ethyl hydrogen 1-azidoethylphosphonate as described in Example 10; the latter compound was made from the sodium salt according to Example 9 and the sodium salt from diethyl-α-chloroethylphosphonate according to Example 6. The structure was confirmed by infrared and nuclear magnetic resonance spectroscopy.

Example 101

Diethyl α-chloro-p-methylbenzylphosphonate was reacted with sodium azide in dimethylformamide as described in Example 6. The ethyl sodium α-azido-p-methylbenzylphosphonate obtained was passed through an ion-exchange column and the half ester acid worked up as described in Example 9. The acid was then esterified with triethyl orthoformate as described in Example 10 to yield diethyl α-azido-p-methylbenzylphosphonate, B.P. 140°/0.1 mm.

Example 102

In the manner described in Example 101 diethyl-α-chlorobenzylphosphonate was reacted to yield diethyl α-azidobenzylphosphonate.

Example 103

1.0 g. of diethyl α-azidobenzylphosphonate was added dropwise to a mixture of 1 ml. of conc. HNO₃ and 1 ml. of conc. H₂SO₄ with stirring at 0 to 2° C. After the addition (10 minutes) the mixture was maintained at this temperature for a further 1½ hours and then poured into 50 ml. of ice-water. The mixture was extracted with benzene, the extract washed with water, sodium carbonate solution and water, dried over sodium sulphate and the benzene removed by distillation to leave diethyl α-azido-p-nitrobenzylphosphonate as a viscous pale yellow oil. Yield 1 g. The structure was confirmed by nuclear magnetic resonance and infrared spectroscopic analyses.

Example 104

Sodium (0.22 mg.) was dissolved in n-butanol (7 ml.) and to the solution was added diethyl azidomethylphosphonate (1.1 g.). The mixture was then set aside in the refrigerator for 48 hours. Gas-liquid chromatography showed diethyl azidomethylphosphonate, n-butyl ethyl azidomethylphosphonate, and di-n-butyl azidomethylphosphonate to be present in the relative molar proportions 2:37:37. The excess of n-butanol was then removed by distillation under reduced pressure and the residual yellow oil (1.5 g.) was fractionated in high vacuum. A fraction of B.P. 92–94°/0.2 mm. (0.5 g.) was substantially a 50:50 mixture of the n-butyl ethyl and di-n-butyl esters.

Examples 105 to 113 inclusive

The following compounds were tested against several species of pests in the manner described by reference to earlier examples; results together with the test species are given in Table 13.

TABLE 13

| Compound | Test Species | Tested as described in Ex. No. | Conc. in percent, w./v. | Percent Mortality |
|---|---|---|---|---|
| Example: | | | | |
| 105. Ethyl isopropyl azidomethylphosphonate | Boophilus microplus adults | 37 | 1.0 | 97 |
| | | 37 | 0.1 | 87 |
| | | 37 | 0.01 | 50 |
| 106. Diethyl azidomethylphosphonate | Boophilus microplus adults | 37 | 1.0 | 93 |
| | | 37 | 0.1 | 83 |
| | | 37 | 0.01 | 57 |
| 107. Ethyl n-propyl azidomethylphosphonate | Boophilus microplus adults | 37 | 1.0 | 100 |
| | | 37 | 0.1 | 93 |
| | | 37 | 0.01 | 30 |
| 108. Ethyl p-nitrophenyl azidomethylphosphonate | Calandra granaria | [1] 25 | 0.1 | 100 |
| | | | 0.02 | 100 |
| 109. sec. Butyl ethyl azidomethylphosphonate | Plutella maculipennis | 26 | 0.025 | 100 |
| 110. Ethyl 2-chloroethyl azidomethylphosphonate | Plutella maculipennis | 26 | 0.1 | 93 |
| | | 26 | 0.05 | 80 |
| 111. sec. Butyl ethyl azidomethylphosphonate | Aphis rosae | 29 | [2] 0.01 | 100 |
| | | 29 | [3] 0.01 | 100 |
| 112. iso-Butyl ethyl azidomethylphosphonate | Tetranychus telarius adults | 24 | 0.05 | 100 |
| | | 24 | 0.01 | 58.5 |
| 113. O,S-diethyl azidomethylphosphonothiolate | Lucilia larvae | 66 | 0.0001 | 100 |

[1] Method 1.
[2] Contact.
[3] Systemic.

We claim:
1. An organophosphorus compound of the formula:

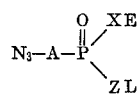

wherein N₃ is an azido group, A is selected from the group consisting of:

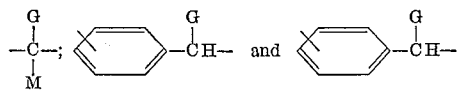

the azido group being in the para- or ortho- position of the benzene ring, and G and M are radicals of no more than 12 carbon atoms independently selected from the group consisting of hydrogen and alkyl, aryl, alkaryl and cycloalkyl and X and Z are independently selected from the group consisting of O, S and N—R, R being a radical of no more than 12 carbon atoms selected from the group consisting of hydrogen and hydrocarbon, and wherein L, E and R independently represent a hydrocarbon radical of 1 to 12 carbon atoms selected from the group consisting of alkyl, alkenyl, alkynyl, aryl, alkaryl, aralkyl, aralkenyl, cycloalkyl, cycloalkenyl, and wherein any one of the radicas L, E, G, M and R, whenever it stands for a hydrocarbon, optionally may bear one or more substituents of no more than 12 carbon atoms selected from the group consisting of halogen, cyano, hydroxy, amino, alkylamino, dialkamino, oxo, alkoxy, aryloxy, alkylthio, arylthio, carbamido, alkanoyloxy, alkoxycarbonyl, aryloxycarbonyl, nitro, nitroso or azido, provided, however, that no carbon carries more than one azido group and that the total number of the azido groups in the molecule is not more than two and wherein whenever both X and Z stand for Y where Y is either O or S, L may also be hydrogen or a cation and wherein furthermore either one or both groups —XE and —ZL may be taken to represent a chlorine atom.

2. An organophosphorus compound of the formula:

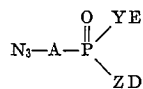

wherein N₃ is an azido group, A is selected from the group consisting of:

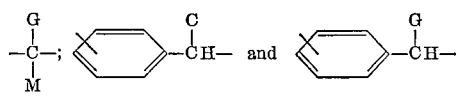

the azido group being in the para- or ortho- position of the benzene ring, and G and M are radicals of no more than 12 carbon atoms independently selected from the group consisting of hydrogen and alkyl, aryl, alkaryl, aralkyl and cycloalkyl and wherein Y stands for O or S and Z stands for O, S or N—R, and Y and Z may be the same or different, R being a radical of no more than 12 carbon atoms selected from the group consisting of hydrogen and hydrocarbon and wherein D stands for a hydrocarbon of 1 to 12 carbon atoms selected from the group consisting of alkyl, alkenyl, alkynyl, aralkyl, aralkenyl, cycloalkyl and cycloalkenyl and wherein E and R independently represent a hydrocarbon radical of 1 to 12 carbon atoms selected from the group consisting of alkyl, alkenyl, alkynyl, aryl, alkaryl, aralkyl, aralkenyl, cycloalkyl, cycloalkenyl, and wherein any one of the radicals D, E, G, M and R, whenever it stands for a hydrocarbon, optionally may bear one or more substituents of no more than 12 carbon atoms selected from the group consisting of halogen, cyano, hydroxy, amino, alkamino, dialkylamino, oxo, alkoxy, aryloxy, alkylthio, arylthio, carbamido, alkanoyloxy, alkoxycarbonyl, aryloxycarbonyl, nitro, nitroso or azido, provided, however, that no carbon carries more than one azido group and that the total number of the azido groups in the molecule is not more than 2.

3. A compound of the formula:

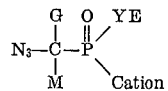

wherein G and M are radicals of no more than 12 carbon atoms independently selected from the group consisting of hydrogen and alkyl, aryl, alkaryl and cycloalkyl, Y is a member selected from the group consisting of O and S, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, cation is hydrogen or a cation, and G, M and E, whenever it stands for a hydrocarbon, optionally may bear one or more substituents of no more than twelve carbon atoms selected from the group consisting of halogen, cyano, hydroxy, amino, alkamino, dialkamino, oxo, alkanoyloxy, aryloxy, alkylthio, arylthio, carbamido, alkoxy, alkoxycarbonyl, aryloxycarbonyl, nitro, nitroso, and azido, provided, however, that no carbon carries more than one azido group, and that the total number of the azido groups in the molecule is not more than 2.

4. A compound according to claim 3 wherein the cation is selected from the group consisting of sodium and potassium.

5. A compound of the formula:

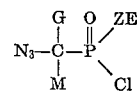

wherein G and M are radicals of no more than twelve carbon atoms independently selected from the group consisting of hydrogen and alkyl, aryl, alkaryl and cycloalkyl, Z is a member selected from the group consisting of O, S, and NR, R being a radical of no more than 12 carbon atoms selected from the group consisting of hydrogen and hydrocarbon, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, and G, M, E and R, whenever it stands for a hydrocarbon, optionally may bear one or more substituents of no more than 12 carbon atoms selected from the group consisting of halogen, cyano, hydroxy, amino, alkamino, dialkamino, oxo, alkanoyloxy, aryloxy, alkylthio, arylthio, carbamido, alkoxy, alkoxycarbonyl, aryloxycarbonyl, nitro, nitroso, and azido, provided, however, that no carbon carries more than one azido group, and that the total number of the azido groups in the molecule is not more than 2.

6. A compound of the formula:

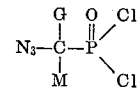

wherein G and M are radicals of no more than 12 carbon atoms independently selected from the group consisting of hydrogen and alkyl, aryl, alkaryl and cycloalkyl, wherein G and M, whenever it stands for a hydrocarbon, optionally may bear one or more substituents of no more than twelve carbon atoms selected from the group consisting of halogen, cyano, hydroxy, amino, alkamino, dialkamino, oxo, alkanoyloxy, aryloxy, alkylthio, arylthio, carbamido, alkoxy, alkoxycarbonyl, aryloxycarbonyl, nitro, nitroso, and azido, provided however, that no carbon carries more than one azido group, and that the total number of the azido groups in the molecule is not more than 2.

7. An organophosphorus compound as claimed in claim 2 wherein A is

8. An organophosphorus compound as claimed in claim 7 wherein G and M are hydrogen.

9. An organophosphorus compound as claimed in claim 8 wherein Y and Z are both O.

10. Diethyl azidomethylphosphonate.
11. Dimethyl azidomethylphosphonate.
12. Ethyl n-propyl azidomethylphosphonate.
13. Ethyl isopropyl azidomethylphosphonate.
14. Iso-butyl ethyl azidomethylphosphonate.
15. Sec. butyl ethyl azidomethylphosphonate.
16. Ethyl 2-chloroethyl azidomethylphosphonate.
17. Ethyl p-nitrophenyl azidomethylphosphonate.
18. Ethyl methyl azidomethylphosphonate.
19. Methyl propyl azidomethylphosphonate.
20. Di-n-propyl azidomethylphosphonate.
21. Methyl isopropyl azidomethylphosphonate.
22. Di-isopropyl azidomethylphosphonate.
23. n-Butyl ethyl azidomethylphosphonate.
24. n-Butyl isopropyl azidomethylphosphonate.
25. Iso-butyl methyl azidomethylphosphonate.
26. Sec. butyl isopropyl azidomethylphosphonate.
27. Di-(sec. butyl) azidomethylphosphonate.
28. Tert. butyl ethyl azidomethylphosphonate.
29. n-Amyl ethyl azidomethylphosphonate.
30. 2-amyl ethyl azidomethylphosphonate.
31. Ethyl 2-octyl azidomethylphosphonate.
32. Methyl 3,5,5-trimethylhexyl azidomethylphosphonate.
33 Ethyl 3,5,5-trimethylhexyl azidomethylphosphonate.
34. n-Dodecyl methyl azidomethylphosphonate.
35. n-Dodecyl ethyl azidomethylphosphonate.
36. n-Hexyl isopropyl azidomethylphosphonate.
37. Methyl phenyl azidomethylphosphonate.
38. 2-diethylaminoethyl ethyl azidomethylphosphonate.
39. 2-azidoethyl ethyl azidomethylphosphonate.
40. Allyl ethyl azidomethylphosphonate.
41. Ethyl prop-2-yn-1-yl azidomethylphosphonate.
42. Ethyl 2-ethoxyethyl azidomethylphosphonate.
43. Ethyl 2-ethylthioethyl azidomethylphosphonate.
44. Cyclohexyl ethyl azidomethylphosphonate.
45. Ethyl phenyl azidomethylphosphonate.
46. Benzyl ethyl azidomethylphosphonate.
47. 2,3-butylene azidomethylphosphonate.
48. Ethyl 2-cyanoethyl azidomethylphosphonate.
49. Sec. butyl 2-chloroethyl azidomethylphosphonate.
50. 1,2-dicarboethoxyethyl ethyl azidomethylphosphonate.
51. O,S-diethyl azidomethylphosphonothiolate.
52. S-sec. butyl O-ethyl azidomethylphosphonothiolate.
53. Diethyl azidomethylphosphonothiolate.
54. Diethyl 1-azidoethylphosphonate.
55. Diethyl α-azidobenzylphosphonate.
56. Diethyl 1 - azido - 2 - hydroxy - 1 - phenylethylphosphonate.
57. 2-nitro-n-butyl ethyl azidomethylphosphonate.
58. Ethyl 2 - methyl - 3,3,4,4 - tetrafluorobutyl-2 azidomethylphosphonate.
59. Ethyl 3,3,4,4-tetrafluorobutyl-2 azidomethylphosphonate.

60. A process for the manufacture of compounds of the formula:

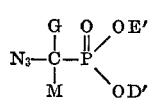

said process comprising reacting a compound of the formula:

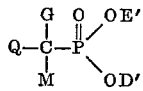

with a water-soluble azide in a polar solvent, wherein Q is selected from the group consisting of chlorine, iodine and bromine, G and M are radicals of no more than 12 carbon atoms independently selected from the group consisting of hydrogen and alkyl, aryl, alkaryl and cycloalkyl and D' and E' independently represent a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, provided, however, that D' and E' cannot be an allylic or acetylenic radical, and wherein any of the radicals G, M, D' and E' whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, alkanoyloxy, alkylthio, arylthio, carbamido, aryloxy, alkoxycarbonyl, aryloxycarbonyl, nitro, nitroso, and azido, provided, however, that no carbon carries more than one azido group, and that the total number of the azido groups in the molecule is not more than 2.

61. A process according to claim 60 wherein Q is chlorine or bromine and wherein the reaction takes place at a temperature between 50 and 170° C.

62. A process according to claim 60 where the polar solvent is a dipolar aprotic solvent.

63. A process according to claim 62 where the solvent is selected from the group consisting of dimethyl sulphoxide, N,N-dimethylformamide, N,N-diethylformamide, sulpholane, N-methylpyrrolidone and N,N-dimethylacetamide.

64. A process according to claim 63 where the solvent is N,N-dimethylformamide.

65. A process according to claim 60 where the water-soluble azide is selected from the group consisting of the alkali metal azides, the alkaline earth metal azides and zinc azide.

66. A process according to claim 65 where the water-soluble azide is potassium azide.

67. A process according to claim 65 where the water-soluble azide is sodium azide.

68. A process of reacting a compound of the formula:

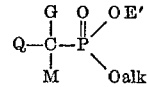

where alk stands for an alkyl group, substituted or unsubstituted, with a water-soluble metal azide selected from the group consisting of alkali metal, alkaline earth metal and zinc azides to produce a half ester salt of the formula:

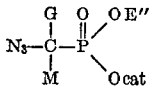

wherein Q is selected from the group consisting of chlorine, iodine and bromine, G and M are radicals of no more than 12 carbon atoms independently selected from the group consisting of hydrogen, alkyl, aryl, alkaryl and cycloalkyl, E' is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, provided, however, that E' cannot be an allylic or acetylenic radical, cat is a cation and E'' is the less easily displaceable of the two radicals E' and alk, and wherein any of the radicals G, M and E', whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

69. A process according to claim 68 at a temperature between 50 and 200° C.

70. A process according to claim 68 at a temperature between 100 and 170° C.

71. A process according to claim 68 carried out in a dipolar aprotic solvent.

72. A process according to claim 71 where the solvent is selected from the group consisting of dimethylsulphoxide, N,N-dimethylformamide, N,N-diethylformamide, sulpholane, N-methylpyrrolidone and N,N-dimethylacetamide.

73. A process according to claim 72 wherein the solvent is N,N-dimethylformamide.

74. A process according to claim 68 where the water-soluble azide is selected from the group consisting of the alkali metal azides, the alkaline earth metal azides and zinc azide.

75. A process according to claim 68 where the water-soluble azide is sodium azide.

76. A process according to claim 68 where the water-soluble azide is potassium azide.

77. A process of reacting a compound of the formula:

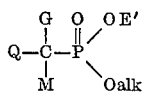

with at least one mole of an alkalizing agent to produce a compound of the formula:

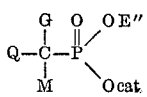

and reacting the latter compound with at least one mole of a water-soluble azide selected from the group consisting of alkali metal, alkaline earth metal and zinc azides to produce a compound of the formula:

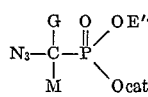

wherein Q is selected from the group consisting of chlorine, iodine and bromine, G and M are radicals of no more than 12 carbon atoms independently selected from the group consisting of hydrogen and alkyl, aryl, alkaryl and cycloalkyl, E' is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, provided, however, that E' cannot be an allylic or acetylenic radical, E'' is the less easily displaceable of the two radicals E' and alk, alk stands for an alkyl group, substituted or unsubstituted, cat is a cation, and wherein any of the radicals G, M and E, whenever it stands for a hydrocarbon, optionally may bear at least one substituent of no more than twelve carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

78. A process according to claim 77 wherein the alkalizing agent is selected from the group consisting of alkali metal hydroxides and alkali metal carbonates.

79. A process according to claim 77 where the reaction with the azide is carried out in a dipolar aprotic solvent.

80. A process according to claim 79 where the alkalizing agent is an alkali metal halide.

81. A process of reacting a compound of the formula:

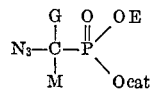

with an alkylating agent selected from the group consisting of substituted or unsubstituted alkyl iodides, alkyl bromides, -oxo-alkyl halides, reactive aryl halides and reactive benzyl halides, alkyl sulphonates and dialkyl sulphates to produce a compound of the formula:

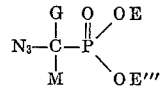

wherein G and M are radicals of no more than 12 carbon atoms independently selected from the group consisting of hydrogen, alkyl, aryl, alkaryl, and cycloalkyl, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, cat is a cation and E''' is the ester group of the said alkylating agent and may be the same as E or different and wherein any of the radicals G, E and M, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, alkylthio, arylthio, carbamido, alkanoyloxy, alkoxycarbonyl, aryloxycarbonyl, nitro, nitroso, and azido, provided, however, that no carbon carreis more than one azido group, and that the total number of the azido groups in the molecule is not more than 2.

82. A process according to claim 81 characterized by the presence of a dipolar aprotic solvent.

83. A process of converting a half ester salt of the formula:

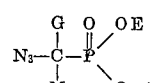

into the corresponding half ester acid wherein G and M are radicals of no more than 12 carbon atoms independently selected from the group consisting of hydrogen, alkyl aryl, alkaryl and cycloalkyl, E is a hydrocarbon radical of 1 to 12 carbon atoms selected from the group consisting of alkyl, alkenyl, alkynyl, aryl, alkaryl, aralkyl, aralkenyl, cycloalkenyl and cycloalkyl, cat is a cation, and wherein any of the radicals G, M and E, whenever it stands for a hydrocarbon, optionally may bear at least one substituent of no more than 12 carbons independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2, which process comprises reacting said compound with an ion exchange resin in the acid form.

84. A process according to claim 83 wherein a strong mineral acid is used in place of the ion exchange basis.

85. A process of esterifying a half ester acid of the formula:

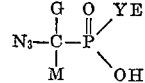

which process comprises reacting the compound with an alcohol or phenol in the presence of dicyclohexylcarbodiimide and, optionally additionally in the presence of a solvent, wherein G and M are radicals of no more than 12 carbon atoms independently selected from the group consisting of hydrogen, alkyl, aryl, alkaryl and cycloalkyl, Y is a member selected from the group consisting of O and S and E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, and wherein any of the radicals G, M and E, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

86. A process of forming a diester

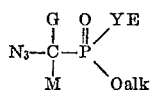

from the half acid ester

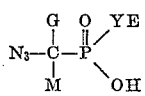

which comprises reacting said half acid ester with a diazoalkane wherein G and M are radicals of no more than 12 carbon atoms independently selected from the group consisting of hydrogen, alkyl, aryl, alkaryl, and cycloalkyl, Y is a member selected from the group consisting of O and S, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl and alk stands for an alkyl group, substituted or unsubstituted, and wherein any of the radicas G, M and E, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

87. A process according to claim 86 wherein alk is methyl and the diazoalkane is diazomethane.

88. A process of esterifying a half acid ester of the formula:

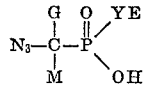

with an ester of orthoformic acid HC(OD)$_3$ wherein D is the desired radical in the phosphonate ester and wherein G and M are radicals of no more than 12 carbon atoms independently selected from the group consisting of hydrogen, alkyl, aryl, alkaryl and cycloalkyl, D stands for a hydrocarbon of 1 to 12 carbon atoms selected from the group consisting of alkyl, alkenyl, alkynyl, aralkyl, aralkenyl, cycloalkyl and cycloalkenyl, Y is a member selected from the group consisting of O and S, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, and wherein any of the radicals G, M, D and E, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

89. The process according to claim 88 wherein D is a lower alkyl group.

90. A process of reacting a half ester salt of the formula

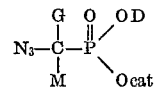

optionally in the presence of an inert solvent with thionly chloride to produce a dichloride of the formula:

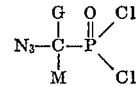

wherein G and M are radicals of no more than 12 carbon atoms independently selected from the group consisting of hydrogen, alkyl, aryl, alkaryl and cycloalkyl, D stands for a hydrocarbon of 1 to 12 carbon atoms selected from the group consisting of alkyl, alkenyl, alkynyl, aralkyl, aralkenyl, cycloalkyl and cycloalkenyl, cat is a cation and wherein any of the radicals G, M and D, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl aryloxycarbonyl, nitro, nitroso, and azido, provided, however, that no carbon carries more than one azido group, and that the total number of the azido groups in the molecule is not more than 2.

91. A process of reacting a dichloride of the formula,

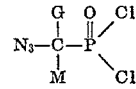

with at least one molar equivalent of a compound EZH to form a compound of the formula:

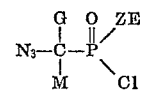

wherein G and M are radicals of no more than 12 carbon atoms independently selected from the group consisting of hydrogen, alkyl, aryl, alkaryl and cycloalkyl, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, Z is selected from the group consisting of O, S and N—R, R being a radical of no more than twelve carbon atoms selected from the group consisting of hydrogen and hydrocarbon, and wherein any of the radicals G, M, E and R, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided however, that no carbon carries more than one azido group, and that the total number of the azido groups in the molecule is not more than 2.

92. A process of reacting a dichloride of the formula:

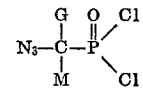

with at least two molar equivalents of a compound EZH to produce a compound of the formula:

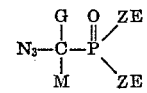

where G and M are radicals of no more than 12 carbon atoms independently selected from the group consisting of hydrogen, alkyl, aryl, alkaryl and cycloalkyl, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, Z is selected from the group consisting of O, S and N—R, R being a radical of no more than twelve carbon atoms selected from the group consisting of hydrogen and hydrocarbon, and wherein any of the radicals G, M, E and R, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

93. A process of manufacture of a compound of the formula:

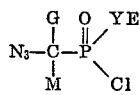

which process comprises reacting approximately 1 mole of thionyl chloride with one mole of a half ester salt:

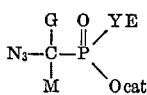

preferably in the presence of a low boiling inert solvent, wherein G and M are radicals of no more than 12 carbon atoms independently selected from the group consisting of hydrogen, alkyl, aryl, alkaryl and cycloalkyl, cat is a cation, E is a hydrocarbon radical of 1 to 12 carbon atoms selected from the group consisting of alkyl, alkenyl, aryl, alkaryl, aralkyl, aralkenyl, cycloalkyl and cycloalkenyl, Y is a member selected from the group consisting of O and S, and wherein any of the radicals G, M and E, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxcarbonyl, nitro, nitroso, and azido, provided, however, that no carbon carries more than one azido group, and that the total number of the azido groups in the molecule is not more than 2.

94. A process according to claim 93 where Y is oxygen.

95. A process of reacting a compound of the formula:

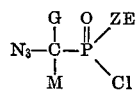

with at least one molar equivalent of a compound $E_1XH$ to produce a compound of the formula:

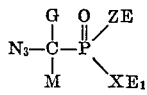

wherein G and M are radicals of no more than 12 carbon atoms independently selected from the group consisting of hydrogen, alkyl, aryl, alkaryl and cycloalkyl, E is a hydrocarbon radical of 1 to 12 carbon atoms selected from the group consisting of alkyl, alkenyl, alkynyl, aryl, alkaryl, aralkyl, aralkenyl, cycloalkyl and cycloakenyl, X and Z are selected from the group consisting of O, S and N—R, R being a radical of no more than twelve carbon atoms selected from the group consisting of hydrogen and hydrocarbon, $E_1$ is E, or whenever both X and Z are O or S, $E_1$ may also be hydrogen or cation, and wherein any of the radicals G, M, E and R, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however that no carbon carries more than one azido group and that the total number of the azido groups in the molecule is not more than 2.

96. A process of manufacture of a compound:

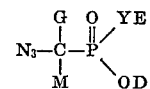

which process comprises reacting a half ester salt:

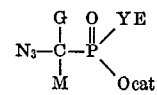

with a chlorocarbonate and a compound DOH wherein G and M are radicals of no more than 12 carbon atoms independently selected from the group consisting of hydrogen, alkyl, aryl, alkaryl and cycloalkyl, cat is a cation, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, X and Z are selected from the group consisting of O and S, D stands for a hydrocarbon of 1 to 12 carbon atoms selected from the group consisting of alkyl, alkenyl, alkynyl, aralkyl, aralkenyl, cycloalkyl and cycloalkenyl, and wherein any of the radicals G, M, E and D, whenever it stands for a hydrocarbon, optionally may bear least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

97. A process according to claim 96 where DOH is a lower alkyl alcohol.

98. A process for compounds of the general formula:

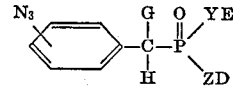

wherein $N_3$ is in the ortho or para position and the phenylene ring may be further substituted and wherein G is a radical of no more than 12 carbon atoms independently selected from the group consisting of hydrogen, alkyl, aryl, alkaryl, and cycloalkyl, Y is a member selected from the group consisting of O and S, Z is selected from the group consisting of O, S and N—R, R being a radical of no more than twelve carbon atoms selected from the group consisting of hydrogen and hydrocarbon, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, D stands for a hydrocarbon of 1 to 12 carbon atoms selected from the group consisting of alkyl, alkenyl, alkynyl, aralkyl, aralkenyl, cycloalkyl and cycloalkenyl, and wherein any of the radicals G, E, R and D, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso and azido, provided, however, that no carbon carries more than one azido group, and that the total number of the azido groups in the molecule is not more than 2, which process comprises diazotising the aminobenzylphosphonate corresponding to the desired azidobenzylphosphonate and reacting the formed diazonium salt intermediate at low temperatures with a water-soluble azide selected from the group consisting of the alkali metal azides, the alkaline earth metal azides and zinc azide.

99. A process which comprises reacting an epoxy compound of the formula:

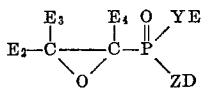

with a water-soluble azide to produce a compound:

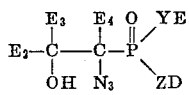

wherein $E_2$, $E_3$ and $E_4$ stand for hydrogen, alkyl, aryl or cycloalkyl and any two alkyl groups $E_2$, $E_3$, $E_4$ may be linked to form a cycloalkyl ring and wherein E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, D stands for a hydrocarbon of 1 to 12 carbon atoms selected from the group consisting of alkyl, alkenyl, alkynyl, aralkyl, aralkenyl, cycloalkyl, and cycloalkenyl, Y is a member selected from the group consisting of O and S, Z is selected from the group consisting of O, S and N—R, R being a radical of no more than twelve carbon atoms selected from the group consisting of hydrogen and hydrocarbon, and wherein any of the radicals D, E and R, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

100. An integrated 3-step process for the manufacture of compounds of the formula:

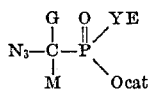

comprising firstly, reacting one mole of a chloride of the formula:

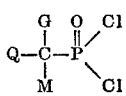

with one mole of a compound EYH in the absence of water to produce a compound:

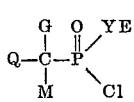

secondly, reacting the latter compound further with at least one mole of water and one mole of an alkalizing agent to form the half ester salt of the formula:

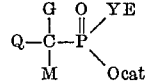

thirdly, reacting this latter half ester salt with a water-soluble azide to form the compound:

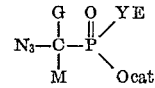

wherein G and M are radicals of no more than 12 carbon atoms independently selected from the group consisting of hydrogen, alkyl, aryl, alkaryl and cycloalkyl, cat is a cation, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, Y is a member selected from the group consisting of O and S, and wherein any of the radicals G, M and E, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, arylthio, alkylthio, carbamido, alkanoyloxy, alkoxycarbonyl, aryloxycarbonyl, nitro, nitroso and azido, provided, however, that no carbon carries more than one azido group, and that the total number of the azido groups in the molecule is not more than 2.

101. A process according to claim 100 where Y is oxygen.

102. A process of reacting a diester of the formula:

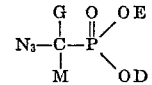

with at least one molar proportion of an alcohol D'''OH under transesterification conditions, wherein D''' stands for a hydrocarbon radical of 1 to 12 carbon atoms selected from the group consisting of alkyl, alkenyl, alkynl, aralkyl, aralkenyl, cycloalkyl and cycloalkenyl, G and M are radicals of no more than 12 carbon atoms independently selected from the group consisting of hydrogen, alkyl, aryl, alkaryl and cycloalkyl, E is a hydrocarbon radical of 1 to 12 carbon atoms selected from the group consisting of alkyl, alkenyl, alkynyl, aryl, alkaryl, aralkyl, aralkenyl, cycloalkyl and cycloalkenyl, D stands for a hydrocarbon of 1 to 12 carbon atoms selected from the group consisting of alkyl, alkenyl, alkynyl, aralkyl, aralkenyl, cycloalkyl and cycloalkenyl, and wherein any of the radicals G, M, E, D and D''', whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso, and azido, provided, however, that no carbon carries more than one azido group, and that the total number of the azido groups in the molecule is not more than 2.

103. A process of reacting a diester of the formula:

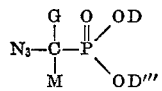

with at least two molar proportions of a reagent $D_1OH$ under transesterification conditions, wherein G and M are radicals of no more than 12 carbon atoms independently selected from the group consisting of hydrogen, alkyl, aryl, alkaryl and cycloalkyl, D, $D_1$ and D''' stand for a hydrocarbon of 1 to 12 carbon atoms selected from the group consisting of alkyl, alkenyl, alkynyl, aralkyl, aralkenyl, cycloalkyl and cycloalkenyl, and wherein any of the radicals G, M, D, $D_1$ and $D'''$, whenever it stands for a hydrocarbon, optionally may bear at least one substituent of no more than 12 carbon atoms independently selected from the group consisting of halogen, cyano, hydroxy, amino, alkamino, dialkamino, oxo, alkoxy, aryloxy, alkylthio, arylthio, carbamido, alkanoyloxy, alkoxycarbonyl, aryloxycarbonyl, nitro, nitroso and azido, provided, however, that no carbon carries more than one azido group, and that the total number of the azido groups in the molecule is not more than 2, and any of the three radicals D, $D'''$ and $D_1$ may be the same.

References Cited

UNITED STATES PATENTS

| | | | |
|---|---|---|---|
| 2,829,111 | 4/1958 | Schrader | 260—349 |
| 3,062,705 | 11/1962 | Youngson | 167—22 |
| 3,087,937 | 4/1963 | Tesi et al. | 260—349 |
| 3,112,244 | 11/1963 | Goyette | 167—22 |

HENRY R. JILES, *Primary Examiner.*

R. T. BOND, *Assistant Examiner.*

U.S. Cl. X.R.

424—211, 217, 224, 226